(12) United States Patent
Shibuya

(10) Patent No.: US 9,403,057 B2
(45) Date of Patent: Aug. 2, 2016

(54) SWING ANALYZING DEVICE, SWING ANALYZING PROGRAM, AND RECORDING MEDIUM

(75) Inventor: Kazuhiro Shibuya, Shiojiri (JP)

(73) Assignee: Seiko Epson Corporation (JP)

(*) Notice: Subject to any disclaimer, the term of this patent is extended or adjusted under 35 U.S.C. 154(b) by 462 days.

(21) Appl. No.: 13/488,953

(22) Filed: Jun. 5, 2012

(65) Prior Publication Data

US 2012/0316004 A1 Dec. 13, 2012

(30) Foreign Application Priority Data

Jun. 9, 2011 (JP) ................................. 2011-129134

(51) Int. Cl.
| | |
|---|---|
| A63B 69/00 | (2006.01) |
| A63B 24/00 | (2006.01) |
| A63B 69/36 | (2006.01) |
| G06K 9/00 | (2006.01) |
| G09B 19/00 | (2006.01) |

(52) U.S. Cl.
CPC ......... *A63B 24/0003* (2013.01); *A63B 24/0006* (2013.01); *A63B 69/3632* (2013.01); *G06K 9/00342* (2013.01); *G06K 9/00543* (2013.01); *G09B 19/0038* (2013.01)

(58) Field of Classification Search
CPC ............... A63B 69/36; A63B 69/3632; A63B 24/0003; A63B 24/0006; G09B 19/0038
USPC .......................................... 473/212, 221, 223
See application file for complete search history.

(56) References Cited

U.S. PATENT DOCUMENTS

| | | | | |
|---|---|---|---|---|
| 5,441,256 | A * | 8/1995 | Hackman | 473/409 |
| 5,478,073 | A * | 12/1995 | Hackman | 473/289 |
| 5,688,183 | A | 11/1997 | Sabatino et al. | |
| 7,264,554 | B2 * | 9/2007 | Bentley | 473/222 |
| 8,506,425 | B2 * | 8/2013 | Wright | A63B 69/3632 473/131 |
| RE44,862 | E * | 4/2014 | Wright | A63B 57/00 473/131 |
| 2001/0053720 | A1 | 12/2001 | Lee et al. | |
| 2006/0211523 | A1 | 9/2006 | Sabatino | |
| 2007/0010344 | A1* | 1/2007 | Mackay | 473/257 |
| 2008/0020867 | A1* | 1/2008 | Manwaring | 473/407 |
| 2009/0247312 | A1* | 10/2009 | Sato et al. | 473/223 |

(Continued)

FOREIGN PATENT DOCUMENTS

| | | |
|---|---|---|
| EP | 1 164 355 | 12/2001 |
| JP | 61-149181 A | 7/1986 |

(Continued)

OTHER PUBLICATIONS

Extended European Search Report for Application No. 12 17 0975 mailed Oct. 25, 2012 (8 pages).
Extended European Search Report for Application No. EP 12 17 0976 dated Oct. 25, 2012 (8 pages).

*Primary Examiner* — Jason Skaarup
(74) *Attorney, Agent, or Firm* — Harness, Dickey & Pierce, P.L.C.

(57) ABSTRACT

A swing analyzing device includes at least a motion sensor, a data acquiring unit, a motion detecting unit, and a swing data determining unit. The data acquiring unit acquires detection data of the motion sensor. The motion detecting unit uses the acquired detection data to detect a motion of a swing and extracts, as swing candidate data, data from which the motion of the swing is detected. The swing data determining unit selects true swing data from the swing candidate data based on determination conditions associated with the swing.

17 Claims, 16 Drawing Sheets

(56) References Cited

U.S. PATENT DOCUMENTS

| | | |
|---|---|---|
| 2009/0291770 A1 | 11/2009 | You |
| 2010/0267462 A1* | 10/2010 | Mooney ................... 473/269 |
| 2011/0143866 A1* | 6/2011 | McConnell ................ 473/409 |
| 2012/0108351 A1* | 5/2012 | Tamura ..................... 473/213 |
| 2012/0157241 A1* | 6/2012 | Nomura ............ A63B 69/0002 473/422 |
| 2012/0190450 A1 | 7/2012 | Nakajima et al. |
| 2012/0196693 A1* | 8/2012 | Takasugi ............ G09B 19/0038 473/221 |
| 2012/0316005 A1* | 12/2012 | Shibuya ............... G09B 19/003 473/212 |
| 2016/0001129 A1* | 1/2016 | Shibuya ............... G09B 19/003 473/266 |

FOREIGN PATENT DOCUMENTS

| | | |
|---|---|---|
| JP | 04-141186 | 5/1992 |
| JP | 10-043349 | 2/1998 |
| JP | 2003-024478 A | 1/2003 |
| JP | 2006-109988 A | 4/2006 |
| JP | 2008-073210 | 4/2008 |
| JP | 2009-517122 A | 4/2009 |
| JP | 2009-125507 | 6/2009 |
| JP | 2010-025737 A | 2/2010 |
| JP | 2010-068947 | 4/2010 |
| WO | WO-2011-057194 A1 | 5/2011 |

* cited by examiner

|  | THRESHOLD VALUE | | |
| --- | --- | --- | --- |
|  | TOP INTERVAL | FINISH INTERVAL | SWING START |
| FULL SWING | A1 | A2 | A3 |
| PUTTER | B1 | B2 | B3 |

FIG. 5

SWING ANALYZING DEVICE, SWING ANALYZING PROGRAM, AND RECORDING MEDIUM

BACKGROUND

1. Technical Field

The present invention relates to a swing analyzing device, a swing analyzing program, and a recording medium on which the swing analyzing program is recorded.

2. Related Art

In sports such as golf, tennis, and baseball, it is considered that competitive abilities can be enhanced by improving the rhythm of a swing. Particularly in golf, since a player hits a ball at rest, there is a view that the more stabilized the rhythm (allocation of time) of each of phases (back swing, top, down swing, impact, and follow through) is, the better the swing is. Therefore, some training tools or the like measure variations in the times of the phases to provide information for analysis. Moreover, JP-A-10-43349 proposes a method in which acceleration of a trainee's body is detected and information of the acceleration is analyzed to calculate a back-swing period, a down-swing (forward-swing) period, a follow-through period, and the like. Further, JP-A-2010-68947 proposes a method in which a motion sensor such as an angular velocity sensor is mounted on a site capable of detecting the movement of a user's trunk axis to measure an angular velocity generated by a golf swing and information of the angular velocity is analyzed to calculate the times of back swing, down swing, follow through, or the like.

However, in the measurement of the swing, a user needs to indicate the timings of the start and end of the measurement in many cases. Therefore, the swing motion is limited, making it impossible in many cases to measure the swing in a natural movement as usual. Moreover, in general, a process of finding a matching pattern through waveform pattern matching is performed for extracting swing data corresponding to the swing motion from sensing data of the motion sensor, which causes a problem that a calculation load is large.

SUMMARY

An advantage of some aspects of the invention is to provide a swing analyzing device for which a user does not need to indicate the timings of the start and end of a swing motion and which can extract swing data with a relatively small calculation load, a swing analyzing program, and a recording medium on which the swing analyzing program is recorded.

(1) An aspect of the invention is directed to a swing analyzing device including: a motion sensor which detects a physical quantity generated by a swing; a data acquiring unit which acquires detection data of the motion sensor; a motion detecting unit which detects a motion of the swing using the acquired detection data and extracts, as swing candidate data, data from which the motion of the swing is detected; and a swing data determining unit which selects true swing data from the swing candidate data based on determination conditions associated with the swing.

According to the swing analyzing device according to the aspect of the invention, swing candidate data is extracted from the detection data acquired from the motion sensor, and it is determined whether or not the swing candidate data is true swing data. Therefore, a user does not need to indicate the timings of the start and end of the swing motion.

Moreover, According to the swing analyzing device according to the aspect of the invention, it is determined, by evaluating the validity of a detected rhythm, whether or not swing candidate data is true swing data. Therefore, compared to the case of performing waveform pattern matching, swing data can be extracted with a smaller calculation load.

(2) In the swing analyzing device, the motion detecting unit may include an impact detecting unit which detects the timing of an impact of the swing using the acquired detection data, and detect the motion of the swing of the swing candidate data on the basis of the timing of the impact.

The timing of an impact is most easily grasped in a series of swing motions because the value of angular velocity changes abruptly at the instant of the impact. Therefore, the timing of the impact is first detected to use the timing of the impact as a basis, so that each of motions of the swing can be detected.

(3) In the swing analyzing device, the motion of the swing may include at least one motion of back swing, top, and down swing.

(4) In the swing analyzing device, the swing data determining unit may use, as one of the determination conditions, a condition that the number of timings of the impacts is one in one piece of the swing candidate data.

In a usual swing motion, it is considered that the number of impacts from the start to end of the swing is one. Accordingly, if the number of timings of impacts is not one in the period of swing candidate data, it can be determined that the swing candidate data is not true swing data.

(5) In the swing analyzing device, the swing data determining unit may use, as one of the determination conditions, a condition that a time of the down swing is shorter than a time of the back swing in one piece of the swing candidate data.

In a usual swing motion, it is considered that the time of a down swing is shorter than the time of a back swing. Accordingly, if the time of the down swing is longer than the time of the back swing in swing candidate data, it can be determined that the swing candidate data is not true swing data.

(6) In the swing analyzing device, the swing data determining unit may use, as one of the determination conditions, a condition that a value obtained by dividing a time of the top by a time from the start of the swing to the end of the swing of the swing candidate data is smaller than a first threshold value in one piece of the swing candidate data.

In a usual swing motion, it is considered that a ratio between a time of a top interval and the entire time falls within a predetermined range. Accordingly, if the ratio between the time of the top interval and the entire time does not fall within the predetermined range, it can be determined that the swing candidate data is not true swing data.

(7) In the swing analyzing device, the first threshold value may be 15%.

(8) In the swing analyzing device, the motion sensor may be an angular velocity sensor which detects angular velocities generated about a plurality of axes by the swing, and the motion detecting unit may include an angular velocity calculating unit which calculates the sum of the magnitudes of the angular velocities generated about the plurality of respective axes using the acquired detection data.

By using an angular velocity sensor as described above, the swing motion can be detected more precisely compared to the case of using an acceleration sensor, and a swing with a small movement can also be detected.

Further, angular velocities about a plurality of axes are detected by an angular velocity sensor, and each of the motions of the swing is detected based on the sum (norm) of the magnitudes of the angular velocities about the respective axes. Therefore, the angular velocity sensor can be mounted in any direction at a place moving in association with the swing motion, which is easy to handle.

(9) In the swing analyzing device, the motion detecting unit may use the sum of the magnitudes of the angular velocities to detect the timing of an impact in the swing.

The timing of an impact is most easily grasped in the series of swing motions because the value of the sum (norm) of the magnitudes of angular velocities changes abruptly at the instant of the impact. Therefore, the timing of the impact is first detected, so that each of the motions of the swing can be detected more reliably.

(10) In the swing analyzing device, the motion detecting unit may further include a differential calculating unit which differentiates the sum of the magnitudes of the angular velocities with respect to time.

(11) In the swing analyzing device, the motion detecting unit may detect a portion where a positive peak and a negative peak successively appear in the differential values, and detects, between the positive peak and the negative peak, the timing of the prior peak as the timing of an impact.

In a usual swing motion, an angular velocity changes abruptly at an impact due to the impact shock. Accordingly, it is possible to grasp, as the timing of the impact, the timing at which the differential value of the sum (norm) of the magnitudes of angular velocities is a local maximum or a local minimum (that is, the timing at which the differential value of the sum of the magnitudes of angular velocities is a positive peak or a negative peak) in the series of swing motions. Since equipment used for the swing vibrates due to the impact, it is considered that the timing at which the differential value of the sum (norm) of the magnitudes of angular velocities is a local maximum and the timing at which the differential value is a local minimum are generated as one pair. It is considered that the prior timing between them is the instant of the impact.

(12) In the swing analyzing device, the motion detecting unit may detect the timing at which the sum of the magnitudes of the angular velocities is a local minimum before the impact as the timing of top of the swing.

In a usual swing motion, it is considered that the motion temporarily stops at top after the start of the swing and thereafter reaches an impact with a gradual increase in swing speed. Accordingly, the timing at which the sum (norm) of the magnitudes of angular velocities is a local minimum before the timing of the impact can be grasped as the timing of the top of the swing.

(13) In the swing analyzing device, the motion detecting unit may detect the timing at which the sum of the magnitudes of the angular velocities is a second threshold value or less before the top as the timing of start of the swing.

In a usual swing motion, the swing motion starts from a state at rest and is unlikely to stop until top. Accordingly, the last timing at which the sum (norm) of the magnitudes of angular velocities is the second threshold value or less before the top can be grasped as the timing of the start of the swing.

(14) In the swing analyzing device, the motion detecting unit may detect the timing at which the sum of the magnitudes of the angular velocities is a local minimum after the impact as the timing of finish of the swing.

In a usual swing motion, it is considered that the swing motion stops with a gradual decrease in swing speed after an impact. Accordingly, the timing at which the sum (norm) of the magnitudes of angular velocities is a local minimum after the impact can be grasped as the timing of the finish.

(15) In the swing analyzing device, the motion detecting unit may detect the first timing at which the sum of the magnitudes of the angular velocities is a third threshold value or less after the impact as the timing of finish of the swing.

In a usual swing motion, it is considered that the swing motion stops with a gradual decrease in swing speed after an impact. Accordingly, the first timing at which the sum (norm) of the magnitudes of angular velocities is the third threshold value or less after the impact can be grasped as the timing of the finish.

(16) In the swing analyzing device, the motion detecting unit may specify an interval from the timing of the start of the swing to the timing of the top as a back-swing interval, and an interval from the timing of the top to the timing of the impact as a down-swing interval.

(17) In the swing analyzing device, the angular velocity sensor may be mountable on at least one of a user's hand, a glove, and swing equipment.

The angular velocity sensor is mountable on a user's hand or a glove, whereby it does not take time to mount the sensor and swing analysis can be easily performed. Moreover, the angular velocity sensor is mountable on swing equipment, whereby an angular velocity can be detected more precisely than when the sensor is mounted on a user's hand or a glove.

(18) The swing analyzing device may further include a display processing unit which calculates, based on the motion of the swing detected by the motion detecting unit, a time of the motion of the swing and displays a calculation result on a screen.

By displaying at least one of the times of the motions of the swing motion, a user can grasp in detail the motion of the swing.

(19) In the swing analyzing device, the swing may be a golf swing. That is, the swing analyzing device may be a golf swing analyzing device.

(20) Another aspect of the invention is directed to a swing analyzing program causing a computer to function as: a data acquiring unit which acquires, from a motion sensor, detection data of a physical quantity generated by a swing; a motion detecting unit which detects a motion of the swing using the acquired detection data and extracts, as swing candidate data, data from which the motion of the swing is detected; and a swing data determining unit which selects true swing data from the swing candidate data based on determination conditions associated with the swing.

(21) Still another aspect of the invention is directed to a recording medium on which the swing analyzing program is recorded.

BRIEF DESCRIPTION OF THE DRAWINGS

The invention will be described with reference to the accompanying drawings, wherein like numbers reference like elements.

FIG. 5 shows one example of a threshold value table of top interval, finish interval, and swing start.

DESCRIPTION OF EXEMPLARY EMBODIMENTS

Hereinafter, a preferred embodiment of the invention will be described in detail using the drawings. The embodiment described below does not unduly limit the contents of the invention set forth in the appended claims. Moreover, not all of the configurations described in the embodiment may necessarily be essential configuration requirements.

In the following, a swing analyzing device which analyzes a golf swing will be described as an example. However, the swing analyzing device of the invention can be applied to swing analyses for various kinds of equipment used for swings, such as tennis rackets or baseball bats.

1. Configuration of Swing Analyzing Device

Figure 1:
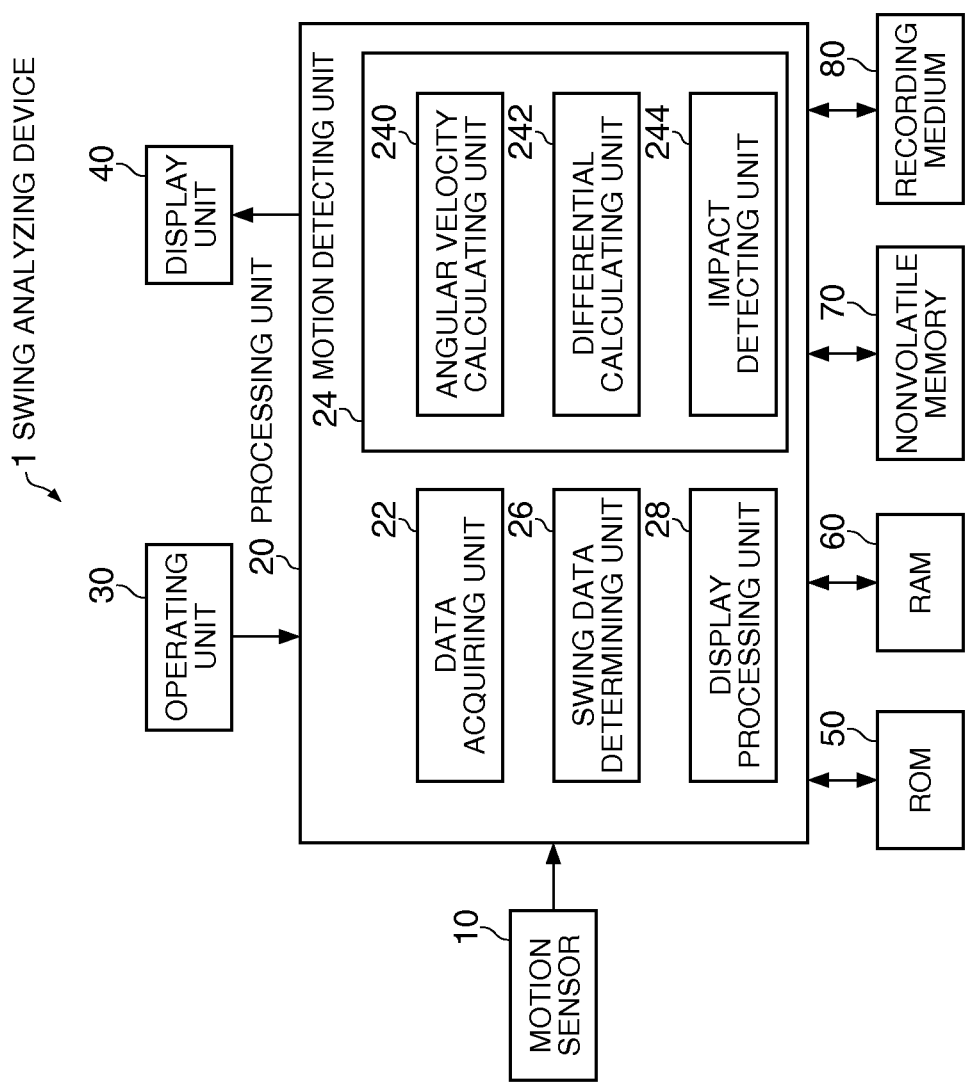
FIG. 1 shows a configuration of a swing analyzing device of an embodiment.

FIG. 1 shows a configuration of the swing analyzing device of the embodiment. The swing analyzing device 1 of the embodiment is configured to include a motion sensor 10, a processing unit 20, an operating unit 30, a display unit 40, a ROM 50, a RAM 60, a nonvolatile memory 70, and a recording medium 80.

The motion sensor 10 detects a physical quantity generated by a swing and outputs detection data. The motion sensor 10 may be a multi-axis sensor capable of detecting physical quantities of a plurality of axes with one element, or may be a sensor mounting a plurality of single-axis sensors each capable of detecting a physical quantity of one axis with one element. As the motion sensor 10, an angular velocity sensor, an acceleration sensor, or the like is applicable. Particularly, the motion sensor 10 of the embodiment is an angular velocity sensor, which detects angular velocities about a plurality of axes and outputs detection data of an angular velocity about each of the axes.

The operating unit 30 performs a process of acquiring operation data from a user and sending the data to the processing unit 20. The operating unit 30 is, for example, a touch panel display, a button, a key, a microphone, or the like.

The display unit 40 displays a processing result of the processing unit 20 as characters, a graph, or other images. The display unit 40 is, for example, a CRT, an LCD, a touch panel display, an HMD (head-mounted display), or the like. The functions of the operating unit 30 and the display unit 40 may be realized by one touch panel display.

The ROM 50 stores various kinds of basic programs with which the processing unit 20 performs a calculation process or a control process, data used for the basic programs, and the like.

The RAM 60 is used as a working area of the processing unit 20, and is a storage unit which temporally stores a program or data read from the ROM 50, data input from the operating unit 30, an operation result executed by the processing unit 20 according to various kinds of programs, and the like.

The nonvolatile memory 70 is a recording unit which records data needing to be stored for a long time, among data generated by the process of the processing unit 20.

The recording medium 80 stores application programs or data for realizing various kinds of application functions, and can be realized by, for example, an optical disc (CD or DVD), a magneto-optical disc (MO), a magnetic disk, a hard disk, a magnetic tape, or a memory (such as a ROM or a flash memory).

The processing unit 20 performs various kinds of processes (an acquisition process of detection data of the motion sensor 10, various kinds of calculation processes, various kinds of control processes, and the like) according to the basic programs stored in the ROM 50 or the application programs stored in the recording medium 80. The processing unit 20 can be realized by a microprocessor or the like.

Particularly, in the embodiment, the processing unit 20 includes a data acquiring unit 22, a motion detecting unit 24, a swing data determining unit 26, and a display processing unit 28, all of which will be described below, and analyzes each motion of a swing motion performed by a user. In the embodiment, the processing unit 20 executes a swing analyzing program stored in the recording medium 80 to thereby function as the data acquiring unit 22, the motion detecting unit 24, the swing data determining unit 26, and the display processing unit 28. That is, the swing analyzing program for causing a computer to function as each of the units is stored in the recording medium 80. Alternatively, a communication unit may be added to the swing analyzing device 1 to receive the swing analyzing program from a server via the communication unit via a wired or wireless communication network, and the received swing analyzing program may be stored in the RAM 60 or the recording medium 80 to execute the swing analyzing program. However, at least a part of the data acquiring unit 22, the motion detecting unit 24, the swing data determining unit 26, and the display processing unit 28 may be realized by hardware (dedicated circuit).

The data acquiring unit 22 performs a process of successively acquiring a series of detection data of the motion sensor 10 on a swing motion of a user. The acquired data is stored in, for example, the RAM 60.

The motion detecting unit 24 uses the detection data acquired by the data acquiring unit 22 to detect the motion of a swing (the motion of the swing including at least one motion of, for example, back swing, top, and down swing), and performs a process of extracting data from which the motion of the swing is detected as swing candidate data. Particularly, the motion detecting unit 24 of the embodiment includes an angular velocity calculating unit 240, a differential calculating unit 242, and an impact detecting unit 244. However, the motion detecting unit 24 of the embodiment may be configured by omitting a part of or all of these configurations (constituents) or adding a new configuration (constituent).

The angular velocity calculating unit 240 performs, based on the detection data acquired by the data acquiring unit 22 from the motion sensor 10, a process of calculating the sum (norm) of the magnitudes of angular velocities about a plurality of axes. In the following, the sum of the magnitudes of angular velocities generated about respective axes is expressed as "norm".

The differential calculating unit 242 performs a process of differentiating the norm of angular velocities calculated by the angular velocity calculating unit 240 with respect to time.

The impact detecting unit 244 uses the detection data acquired by the data acquiring unit 22 to perform a process of detecting the timing of an impact in a swing. For example, the impact detecting unit 244 uses the norm of angular velocities calculated by the angular velocity calculating unit 240 based on the detection data to perform the process of detecting the timing of an impact in a swing. The impact detecting unit 244 may detect a portion where a positive peak (local maximum point) and a negative peak (local minimum point) successively appear (portion including these peaks in a predetermined time) in the differential values of the norms of angular velocities calculated by the differential calculating unit 242, and may detect, as the timing of an impact, the timing of the prior peak between the positive peak and the negative peak. Particularly, the impact detecting unit 244 may detect, between the timing at which the differential value of the norm of angular velocities calculated by the differential calculating unit 242 is maximal and the timing at which the differential value is minimal, the prior timing as the timing of one impact (maximum impact). Alternatively, the impact detecting unit 244 may detect the timing at which the norm of angular velocities is maximal as the timing of one impact (maximum impact).

The motion detecting unit 24 may detect the motion of the swing of swing candidate data on the basis of the timing of the impact (maximum impact) detected by the impact detecting unit 244.

The motion detecting unit 24 may detect, in the swing candidate data, the timing at which the norm of angular velocities calculated by the angular velocity calculating unit 240 is a local minimum before the impact (maximum impact) detected by the impact detecting unit 244 as the timing of top of the swing.

Moreover, the motion detecting unit 24 may specify, in the swing candidate data, a continuous interval in which the norm of angular velocities is a given threshold value or less before the impact (maximum impact) as a top interval (lag interval at top).

Moreover, the motion detecting unit 24 may detect, in the swing candidate data, the timing at which the norm of angular velocities is a second threshold value or less before the top as the timing of the start of the swing.

Further, the motion detecting unit 24 may specify an interval from the timing of the start of the swing to the timing of the top as a back-swing interval, and may specify an interval from the timing of the top to the timing of the impact (maximum impact) as a down-swing interval.

Moreover, the motion detecting unit 24 may detect, in the swing candidate data, the timing at which the norm of angular velocities is a local minimum after the impact (maximum impact) as the timing of the end (finish) of the swing. Alternatively, the motion detecting unit 24 may detect the first timing at which the norm of angular velocities is a third threshold value or less after the impact (maximum impact) as the timing of the end (finish) of the swing.

Moreover, the motion detecting unit 24 may detect, in the swing candidate data, a continuous interval in which the norm of angular velocities is a fourth threshold value or less after the timing of the impact (maximum impact) and close to the timing of the impact (maximum impact) as a finish interval.

The swing data determining unit 26 performs, based on determination conditions associated with the swing, a process of selecting true swing data from swing candidate data.

The swing data determining unit 26 may use, as one of the determination conditions, a condition that the number of timings of the impacts is one (only the maximum impact is present) in one piece of swing candidate data.

Moreover, the swing data determining unit 26 may use, as one of the determination conditions, a condition that the time of the down swing is shorter than the time of the back swing in one piece of the swing candidate data.

Moreover, the swing data determining unit 26 may use, as one of the determination conditions, a condition that a value obtained by dividing the time of the top by the time from the start of the swing of the swing candidate data to the end of the swing is smaller than the first threshold value in one piece of the swing candidate data.

The display processing unit 28 performs, based on each motion of a user's swing detected by the motion detecting unit 24, a process of calculating the time of each motion of the swing and displaying the calculation result on a screen (the display unit 40).

The processing unit 20 of the embodiment may be configured by omitting a part of these configurations (constituents) or adding a new configuration (constituent).

All or a part of the functions of the processing unit 20, the operating unit 30, the display unit 40, the ROM 50, the RAM 60, the nonvolatile memory 70, and the recording medium 80 can be realized by a personal computer (PC), or a mobile device such as a smartphone.

The swing analyzing device 1 may be configured as one of a separate type in which the motion sensor 10 and the processing unit 20 are physically separated from each other, and wireless or wired data communication may be performed between the motion sensor 10 and the processing unit 20. Alternatively, the swing analyzing device 1 may be configured as one of an integral type in which the motion sensor 10 and the processing unit 20 are disposed in one case.

Figure 2A:
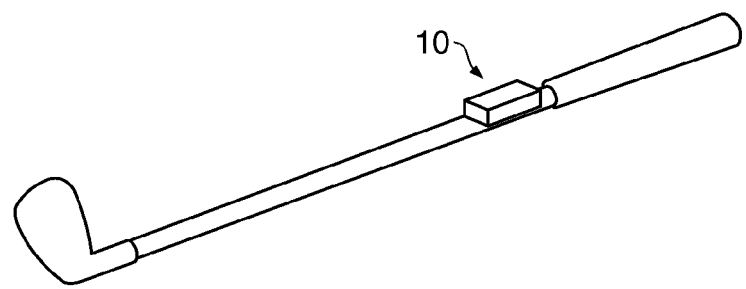
FIGS. 2A to 2C each show one example of a mounting position of a motion sensor.
Figure 2B:
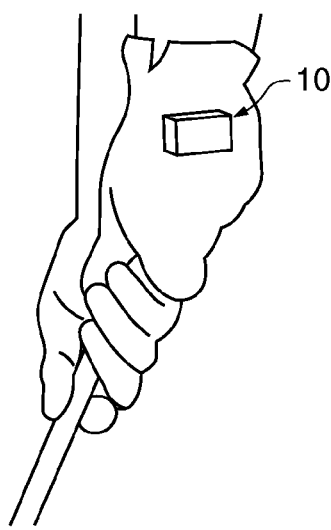
Figure 2C:
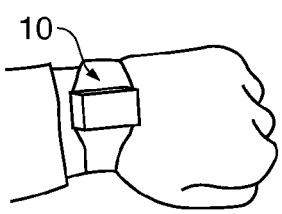

When the swing analyzing device 1 is configured as one of the separate type, the motion sensor 10 is mounted at any position capable of detecting an angular velocity generated according to a swing motion. For example, the motion sensor 10 is mounted on swing equipment such as a golf club as shown in FIG. 2A. However, it is preferable to mount the motion sensor 10 on a shaft as shown in the drawing so that the motion sensor 10 is not subjected to the influence of shock at an impact. Other than that, the motion sensor 10 may be mounted on a user's hand or a glove as shown in FIG. 2B, or may be mounted on an accessory such as a wristwatch as shown in FIG. 2C.

Moreover, when the swing analyzing device 1 is configured as one of the integral type, the swing analyzing device 1 itself may be mounted on swing equipment such as a golf club, a user's hand, a glove, an accessory, or the like.

2. Process of Swing Analyzing Device 2-1. Entire Process of Swing Analysis

Figure 3:
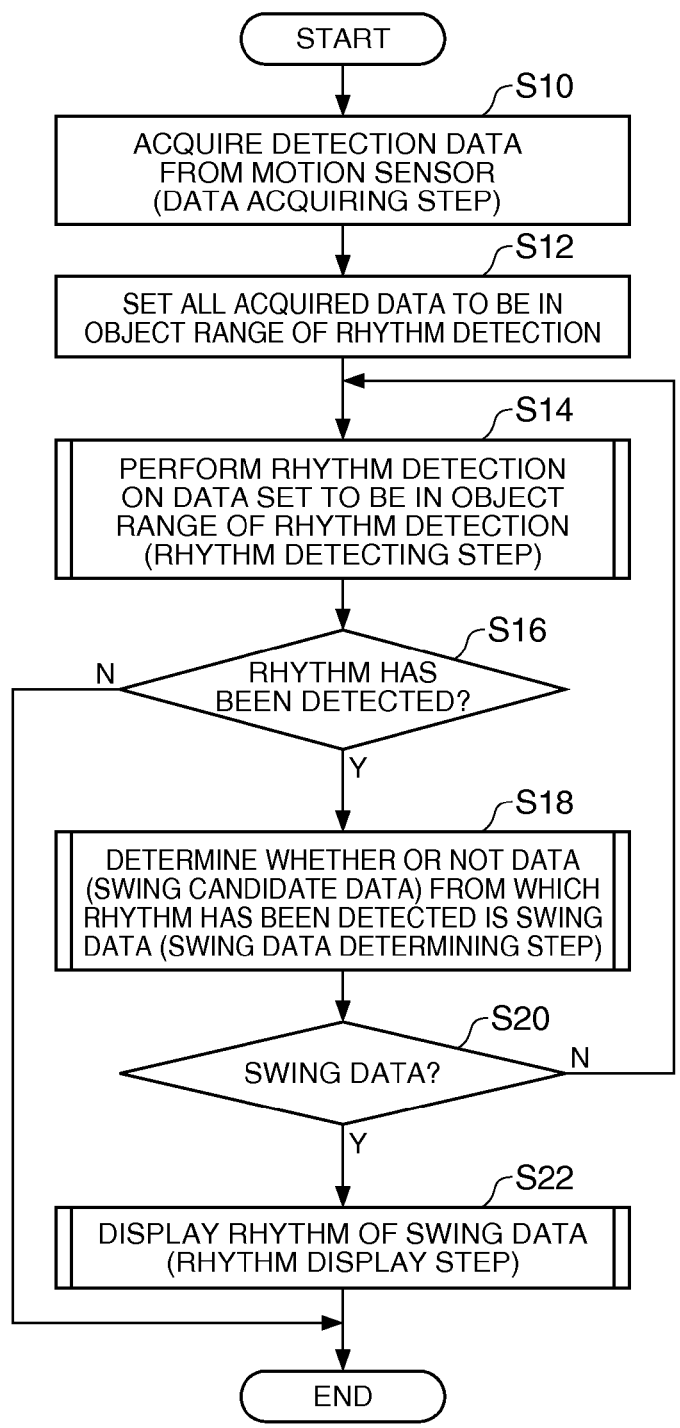
FIG. 3 is a flowchart showing one example of the entire process of swing analysis.

FIG. 3 is a flowchart showing one example of the entire process of swing analysis performed by the processing unit 20 of the swing analyzing device 1.

As shown in FIG. 3, the processing unit 20 of the embodiment first functions as the data acquiring unit 22 to acquire detection data from the motion sensor 10 (S10: data acquiring step). A period (data acquiring period) in which the data acquiring unit 22 acquires the data from the motion sensor 10 is set by some kind of method. For example, a user or an assistant may operate the operating unit 30 before the start of a swing to thereby indicate the start timing of the data acquiring period, and may operate the operating unit 30 after the end of the swing to thereby indicate the end timing of the data acquiring period. Moreover, for example, a user or an assistant may operate the operating unit 30 before the start of a swing to thereby indicate the start timing of the data acquiring period, and the data acquiring period may automatically end after an elapse of a predetermined time.

Next, the processing unit 20 functions as the motion detecting unit 24 to set all the data acquired at Step S10 to be in an object range of rhythm detection (S12) and perform the rhythm detection on the data (that is, all the acquired data) set to be in the object range of rhythm detection (S14: rhythm detecting step). The term "rhythm(s)" used herein means a series of motions from the start of a swing to the end of the swing, and corresponds to, in the case of a golf swing for example, a series of motions of the start of a swing, back swing, top, down swing, impact, follow through, and the end of the swing.

If the rhythm has not been detected at Step S14 (N at S16), it is determined that data (swing data) corresponding to the swing motion has not been included in the acquired data, and the process ends. In this case, the fact that the swing data was not included in the acquired data may be displayed on the display unit 40.

On the other hand, if the rhythm has been detected at Step S14 (Y at S16), the processing unit 20 functions as the swing data determining unit 26 to determine whether or not data (swing candidate data) from which the rhythm has been detected at Step S14 is swing data corresponding to the swing motion of a user (S18: swing data determining step).

If it was determined at step S18 that the swing candidate data was the swing data (Y at S20), the processing unit 20 functions as the display processing unit 28 to display the rhythm of the swing data on the display unit 40 (S22: rhythm display step), and ends the process.

On the other hand, if it was determined at Step S18 that the swing candidate data was not the swing data (N at S20), the processing unit 20 resets the object range of rhythm detection and performs again the processes at and subsequent to Step S14.

2-2. Rhythm Detection Process

Figure 4:
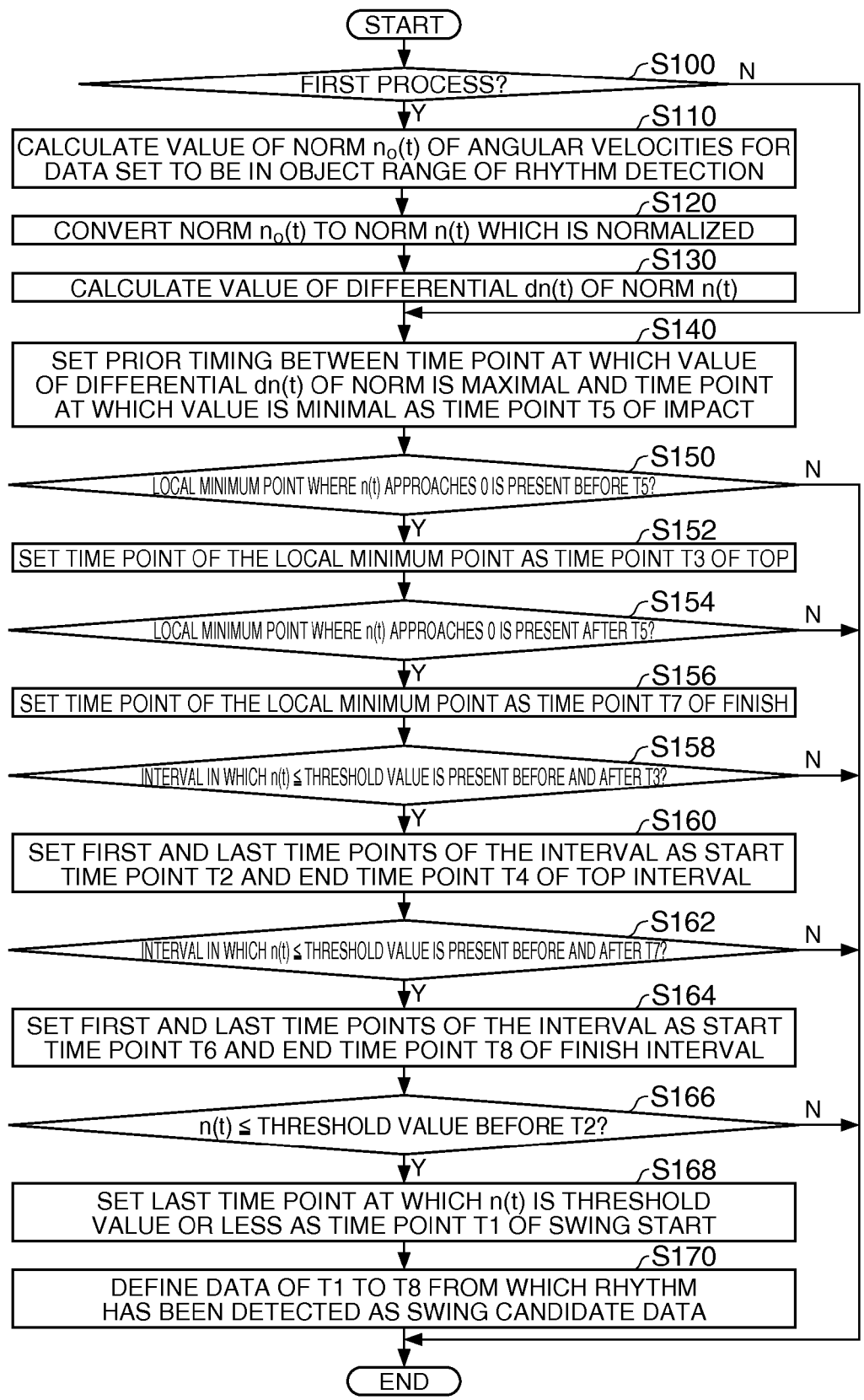
FIG. 4 is a flowchart showing one example of a detection process of a swing motion.

FIG. 4 is a flowchart showing one example of a rhythm detection process performed by the processing unit 20 (the motion detecting unit 24).

As shown in FIG. 4, the processing unit 20 (the motion detecting unit 24) first functions as the angular velocity calculating unit 240 in a first rhythm detection process (Y at S100) to calculate the value of a norm $n_0(t)$ of angular velocities at each of time points t for data set to be in the object range of rhythm detection (hereinafter referred to as "rhythm detection object data") (S110). As one example of a method of obtaining the norm (sum of the magnitudes of angular velocities) of angular velocities, there is a method of obtaining the norm from "the square root of the sum of the squares of the magnitudes of angular velocities". For example, when it is assumed that the motion sensor 10 detects angular velocities about three axes, and that detection data corresponding to three axes at each of the time points t are defined as x(t), y(t), and z(t) for the rhythm detection object data, the norm $n_0(t)$ of the angular velocities is calculated by the following expression (1).

$$n_0(t) = \sqrt{x(t)^2 + y(t)^2 + z(t)^2} \quad (1)$$

Next, the processing unit 20 (the motion detecting unit 24) converts, for the rhythm detection object data, the norm $n_0(t)$ of the angular velocities at each of the time points t to a norm n(t) which is normalized in a predetermined range (S120). Specifically, when the maximum value of the norm of the angular velocities in the rhythm detection object data is defined as $\max(n_0)$, the norm $n_0(t)$ of the angular velocities is converted by the following expression (2) to the norm n(t) which is normalized in the range of from 0 to 100.

$$n(t) = \frac{100 \times n_0(t)}{\max(n_0)} \quad (2)$$

Next, the processing unit 20 (the motion detecting unit 24) functions as the differential calculating unit 242 to calculate the value of the differential of the norm (the norm n(t) after normalization) at each of the time points t (S130). For example, an acquisition interval of the rhythm detection object data is defined as Δt, a differential (difference) dn(t) of the norm of the angular velocities at the time point t is calculated by the following expression (3).

$$dn(t) = n(t) - n(t - \Delta t) \quad (3)$$

On the other hand, in a second and subsequent rhythm detection processes (N at S100), the processes of Step S110 to Step S130 are not performed.

Next, the processing unit 20 (the motion detecting unit 24) functions as the impact detecting unit 244 to set, between a time point at which the value of the differential dn(t) of the norm is maximal and a time point at which the value is minimal, the prior time point as a time point T5 of the impact (maximum impact) (S140). In a usual golf swing, it is considered that the swing speed is maximal at the instant of the impact. Then, it is considered that the value of the norm of angular velocities also changes according to the swing speed. Therefore, the timing at which the differential value of the norm of angular velocities is maximal or minimal (that is, the timing at which the differential value of the norm of angular velocities is a positive maximum value or a negative minimum value) in the series of swing motions can be grasped as the timing of the impact. Since a golf club vibrates due to the impact, it is considered that the timing at which the differential value of the norm of angular velocities is maximal and the timing at which the differential value is minimal are generated as one pair. It is considered that the prior timing between them is the instant of the impact.

Next, the processing unit 20 (the motion detecting unit 24) determines whether or not a local minimum point where the value of the norm n(t) approaches 0 is present before the time point T5 of the impact (S150). If present (Y at S150), the time point of the local minimum point is set as a time point T3 of the top (S152). In a usual golf swing, it is considered that the motion temporarily stops at top after the start of the swing and thereafter reaches an impact with a gradual increase in swing speed. Accordingly, the timing at which the norm of angular velocities approaches 0 to be a local minimum before the timing of the impact can be grasped as the timing of the top.

On the other hand, if the local minimum point where the value of the norm n(t) approaches 0 is not present before the time point T5 of the impact (N at S150), the processing unit 20 (the motion detecting unit 24) determines that the rhythm detection for the rhythm detection object data has failed (swing candidate data is not included in the rhythm detection object data), and ends the process.

Next, the processing unit 20 (the motion detecting unit 24) determines whether or not a local minimum point where the value of the norm n(t) approaches 0 is present after the time point T5 of the impact (S154). If present (Y at S154), the time point of the local minimum point is set as a time point T7 of finish (S156). In a usual golf swing, it is considered that the swing stops after an impact with a gradual decrease in swing speed. Accordingly, the timing at which the norm of angular velocities approaches 0 to be a local minimum after the timing of the impact can be grasped as the timing of the finish.

On the other hand, if the local minimum point where the value of the norm n(t) approaches 0 is not present after the time point T5 of the impact (N at S154), the processing unit 20 (the motion detecting unit 24) determines that the rhythm detection for the rhythm detection object data has failed (swing candidate data is not included in the rhythm detection object data), and ends the process.

Next, the processing unit 20 (the motion detecting unit 24) determines whether or not an interval in which the value of the norm n(t) is a preset threshold value or less is present before and after the time point T3 of the top (S158). If present (Y at S158), the first and last time points of the interval are set respectively as a start time point T2 and an end time point T4 of the top interval (S160). In a usual golf swing, since the motion temporarily stops at top, it is considered that the swing speed is small before and after the top. Accordingly, a continuous interval in which the timing of the top is included and the norm of angular velocities is a given threshold value or less can be grasped as the top interval.

On the other hand, if the interval in which the value of the norm n(t) is the threshold value or less is not present before and after the time point T3 of the top (N at S158), the processing unit 20 (the motion detecting unit 24) determines that the rhythm detection for the rhythm detection object data has failed (swing candidate data is not included in the rhythm detection object data), and ends the process.

Next, the processing unit 20 (the motion detecting unit 24) determines whether or not an interval in which the value of the norm n(t) is a preset threshold value or less is present before and after the time point T7 of the finish (S162). If present (Y at S162), the first and last time points of the interval are set respectively as a start time point T6 and an end time point T8 of the finish interval (S164). In a usual golf swing, it is considered that the swing stops after an impact with a gradual decrease in swing speed. Accordingly, a continuous interval in which the timing of the finish is included and the norm of angular velocities is a given threshold value or less can be grasped as the finish interval.

On the other hand, the interval in which the value of the norm n(t) is the threshold value or less is not present before and after the time point T7 of the finish (N at S162), the processing unit 20 (the motion detecting unit 24) determines that the rhythm detection for the rhythm detection object data has failed (swing candidate data is not included in the rhythm detection object data), and ends the process.

Next, the processing unit 20 (the motion detecting unit 24) determines whether or not the value of the norm n(t) is a preset threshold value (one example of the second threshold value) or less before the start time point T2 of the top interval (S166). If the value of the norm n(t) is the threshold value or less (Y at S166), the last time point at which the value of the norm n(t) is the threshold value or less is set as a time point T1 of swing start (S168). A local minimum point where the norm approaches 0 before the local minimum point for specifying the top may be deemed as the swing start. In a usual golf swing, the swing motion starts from a state at rest and is unlikely to stop until top. Accordingly, the last timing at which the norm of angular velocities is the threshold value or less before the timing of the top can be grasped as the timing of the start of the swing motion.

On the other hand, if the value of the norm n (t) is not the threshold value or less before the start time point T2 of the top interval (N at S166), the processing unit 20 (the motion detecting unit 24) determines that the rhythm detection for the rhythm detection object data has failed (swing candidate data is not included in the rhythm detection object data), and ends the process.

Finally, the processing unit 20 (the motion detecting unit 24) defines the data of T1 to T8 from which the rhythm has been detected as swing candidate data (S170), and ends the process.

The respective threshold values of the top interval, the finish interval, and the swing start are stored as, for example, table data shown in FIG. 5 in the ROM 50, the RAM 60, or the like. These threshold values may be fixed values or variable values (for example, individually set for every user). When the respective threshold values are previously provided corresponding to the motions as shown in FIG. 5, even if a plurality of local minimum points are generated, a local minimum point corresponding to a swing can be easily extracted.

The steps in the flowchart of FIG. 4 may be appropriately replaced with each other.

Moreover, in the flowchart of FIG. 4, it is possible to omit the step (S130) of calculating the value of the differential dn(t) of the norm (norm after normalization) n(t) at each of the time points t. Particularly, for a swing having a large change in the norm of angular velocities, like a driver swing, the differential step (S130) can be omitted. When S130 is omitted, the maximum value of the norm of angular velocities obtained at S120 may be detected as the timing of the impact (maximum impact).

Moreover, at Step S154 and Step S156 in the flowchart of FIG. 4, the local minimum point where the value of the norm n(t) of angular velocities approaches 0 after the timing of the impact is set as the timing of the finish. However, for example, the first timing at which the value of the norm n(t) of angular velocities is the preset threshold value (one example of the third threshold value) or less after the impact may be set as the timing of the finish of a swing.

Moreover, in the flowchart of FIG. 4, all of the motions of the start of a swing, back swing, top, down swing, impact, follow through, and the end of the swing are detected. However, for example, at least one motion of the swing motions may be detected, such as the case where only the motions of impact and down swing are detected.

2-3. Swing Data Determining Process

Figure 6:
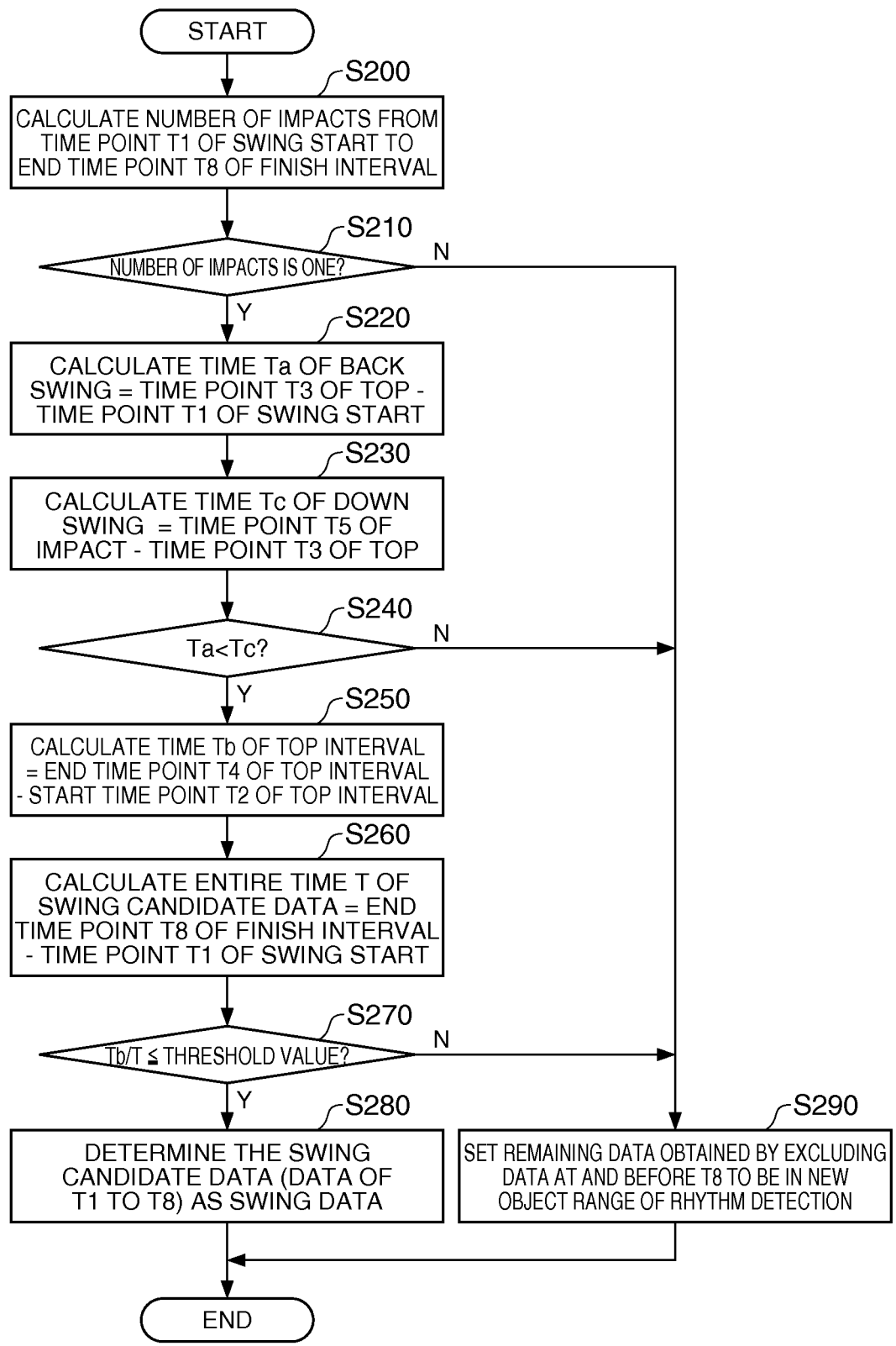
FIG. 6 is a flowchart showing one example of a swing data determining process.

FIG. 6 is a flowchart showing one example of a swing data determining process performed by the processing unit 20 (the swing data determining unit 26).

As shown in FIG. 6, the processing unit 20 (the swing data determining unit 26) first calculates, in swing candidate data, the number of impacts from the time point T1 of the swing start to the end time point T8 of the finish interval (S200). The "impact" used herein includes not only the impact (maximum impact) that a golf club hits a ball but also an impact that a golf club hits the ground or an obstacle. For example, the processing unit 20 (the swing data determining unit 26) calculates, as the number of impacts, the number of times that the differential (difference) dn(t) of the norm of angular velocities crosses over a preset threshold value.

If the number of impacts included from the time point T1 of the swing start to the end time point T8 of the finish interval is only one (Y at S210), the processing unit 20 (the swing data determining unit 26) calculates a time Ta of back swing=the time point T3 of the top—the time point T1 of the swing start (S220), and further calculates a time Tc of down swing=the time point T5 of the impact—the time point T3 of the top (S230).

On the other hand, if the number of impacts included from the time point T1 of the swing start to the end time point T8 of the finish interval is two or more (N at S210), the processing unit 20 (the swing data determining unit 26) determines that the swing candidate data is not true swing data, and sets remaining data obtained by excluding data at and before the time point T8 from the object range of rhythm detection to be in a new object range of rhythm detection (S290). In a usual swing motion, it is considered that the number of impacts included from the start to the end of the swing is one. Therefore, if the number of timings of impacts is not one in the period of swing candidate data, it can be determined that the swing candidate data is not true swing data.

Then, if the time Ta of the back swing is shorter than the time Tc of the down swing (Y at S240), the processing unit 20 (the swing data determining unit 26) calculates a time Tb of the top interval=the end time point T4 of the top interval–the start time point T2 of the top interval (S250), and further calculates an entire time T of the swing candidate data=the end time point T8 of the finish interval–the time point T1 of the swing start (S260).

On the other hand, if the time Ta of the back swing is the time Tc of the down swing or more (N at S240), the processing unit 20 (the swing data determining unit 26) determines that the swing candidate data is not true swing data, and sets remaining data obtained by excluding data at and before the time point T8 from the object range of rhythm detection to be in a new object range of rhythm detection (S290). In a usual swing motion, it is considered that the time of the down swing is shorter than the time of the back swing. Therefore, if the time Tc of the down swing in swing candidate data is the time Ta of the back swing or more, it can be determined that the swing candidate data is not true swing data.

Finally, the processing unit 20 (the swing data determining unit 26) calculates the value of (the time Tb of the top interval/ the entire time T of the swing candidate data). If the value of Tb/T is a preset threshold value (one example of the first threshold value) or less (Y at S270), the processing unit 20 (the swing data determining unit 26) determines the swing candidate data (data of T1 to T8) as true swing data (S280), and ends the process.

On the other hand, if the value of Tb/T is not the threshold value or less (N at S270), the processing unit 20 (the swing data determining unit 26) determines that the swing candidate data is not true swing data, and sets remaining data obtained by excluding data at and before the time point T8 from the object range of rhythm detection to be in a new object range of rhythm detection (S290). In a usual swing motion, it is considered that the ratio between the time of the top interval and the entire time falls in a predetermined range. Therefore, if the value of Tb/T in swing candidate data is not the threshold value or less, it can be determined that the swing candidate data is not true swing data. For example, it is considered that the value of Tb/T does not exceed 0.15 (=15%) in true swing data. Therefore, the threshold value can be set to 0.15 (=15%).

The steps in the flowchart of FIG. 6 may be appropriately replaced with each other.

Figure 7:
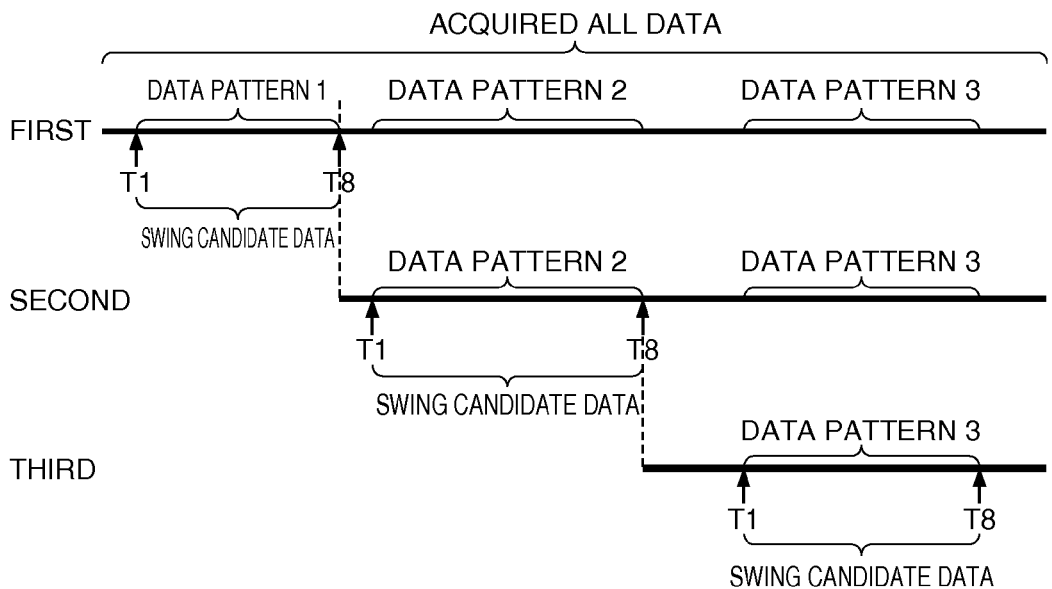
FIG. 7 is an explanatory view of the swing data determining process.

When a plurality of data patterns serving as swing candidate data are included in all data acquired from the motion sensor 10, the rhythm detection process of FIG. 4 and the swing data determining process of FIG. 6 are repeatedly performed until swing data is detected or it is determined that all the data patterns are not swing data. For example, it is assumed that three data patterns (a data pattern 1, a data pattern 2, and a data pattern 3 in time series order) serving as swing candidate data are included in all data acquired from the motion sensor 10, and that the last data pattern 3 is swing data. In this case, as shown in FIG. 7, a first rhythm detection process is performed on all the data acquired from the motion sensor 10 using all the data as rhythm detection object data, and the data pattern 1, for example, is detected as swing candidate data. Then, since the data pattern 1 is not swing data, second rhythm detection is performed on remaining data obtained by removing the data pattern 1 from the first rhythm detection object data. When the data pattern 2, for example, is detected in the second rhythm detection process, since the data pattern 2 is also not swing data, third rhythm detection is performed on remaining data obtained by removing the data pattern 2 from the second rhythm detection object data. The data pattern 3 is detected in the third rhythm detection process, and the data pattern 3 is determined as swing data.

2-4. Rhythm Display Process

Figure 8:
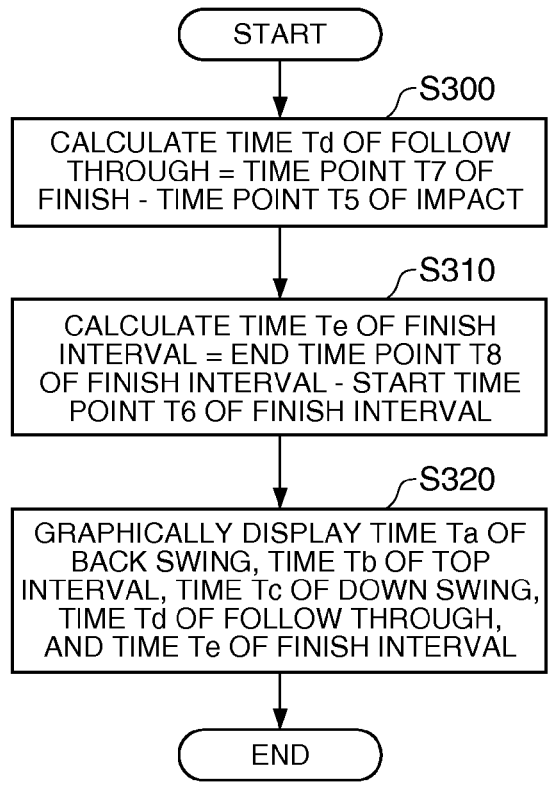
FIG. 8 is a flowchart showing one example of a display process of the swing motion.

FIG. 8 is a flowchart showing one example of a rhythm display process performed by the processing unit 20 (the display processing unit 28).

First, the processing unit 20 (the display processing unit 28) calculates, for swing data, a time Td of follow through=the time point T7 of the finish–the time point T5 of the impact (S300).

Next, the processing unit 20 (the display processing unit 28) calculates a time Te of the finish interval=the end time point T8 of the finish interval–the start time point T6 of the finish interval (S310).

Finally, the processing unit 20 (the display processing unit 28) graphically displays, on the display unit 40, the times (the time Ta of the back swing, the time Tb of the top interval, the time Tc of the down swing, the time Td of the follow through, and the time Te of the finish interval) of the phases calculated respectively at Step S220, Step S250, and Step S230 of FIG. 6 and Step S300 and Step S310 of FIG. 8 (S320).

Figure 9:
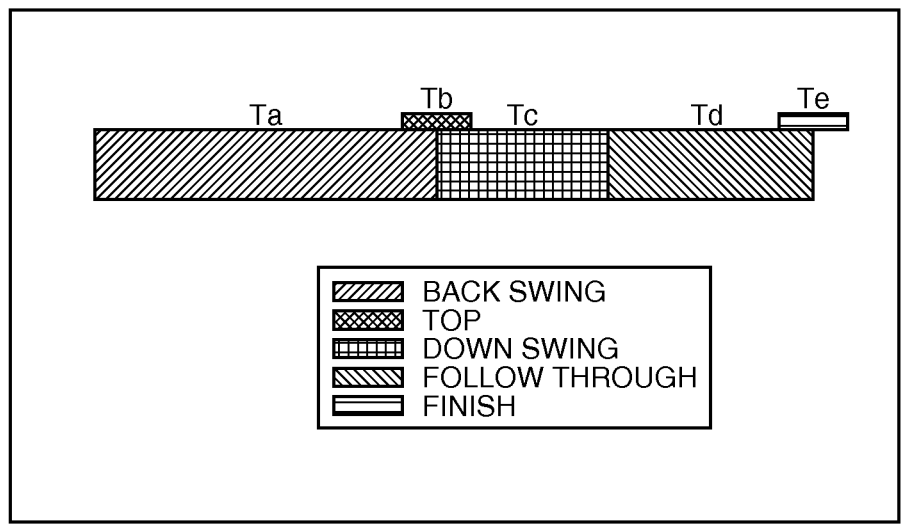
FIG. 9 shows one example of display of the swing motion.

FIG. 9 shows one example of rhythm display of a swing motion. In the display example of FIG. 9, the respective phases (back swing, top interval, down swing, follow through, and finish interval) in the swing motion are displayed in time series as rectangles with lengths proportional to the respective times Ta, Tb, Tc, Td, and Te and each having a specific color or pattern. Moreover, the respective times Ta, Tb, Tc, Td, and Te are displayed above the display of the rectangles of the respective phases. With such rhythm display, a user can obtain detailed information on the rhythms of his/her own swing motion, such as that, for example, lag is insufficient at top because the time Tb of the top interval is short, or that the impact is weak because the time Tc of the down swing is long. Moreover, not only are all the rhythms of the swing displayed, but also the time may be displayed at each motion of the swing.

3. Experimental Example

FIGS. 10 to 14 relate to an experimental example of rhythm analysis of a swing motion using the swing analyzing device 1 of the embodiment.

Figure 10:
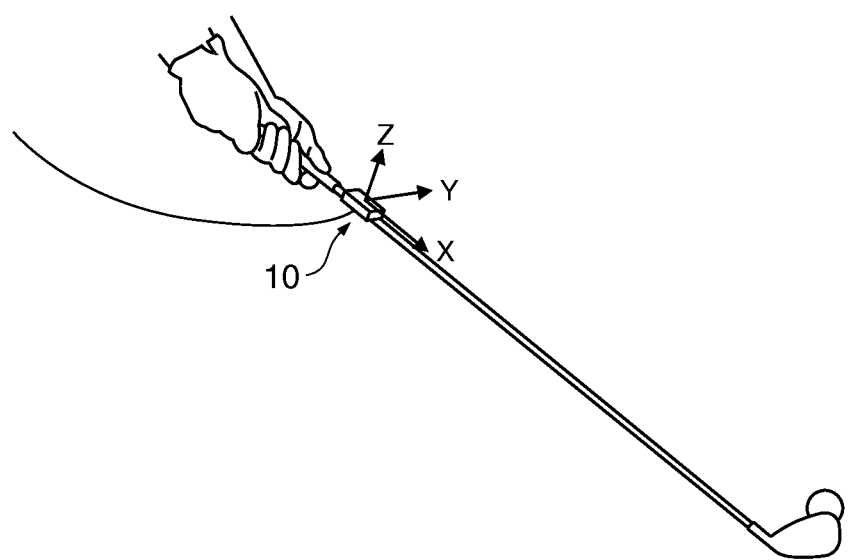
FIG. 10 is an explanatory view of the mounting position and direction of the motion sensor in an experimental example.

As shown in FIG. 10, in the experimental example, the motion sensor 10 which detects angular velocities about three axes was mounted in the vicinity of the grip of the shaft of a golf club (driver), and the rhythms when a subject made a swing only once to hit a golf ball were analyzed. The motion sensor 10 was mounted such that an x-axis is a direction parallel to the shaft, a y-axis is a direction of the swing, and a z-axis is a direction perpendicular to a plane of the swing.

However, since the swing analyzing device 1 of the embodiment calculates the time of each of the phases based on the norm of angular velocities, any mounting angle can be set for the motion sensor 10. Moreover, the motion sensor 10 was connected to a not-shown PC (including the processing unit 20, the operating unit 30, the display unit 40, the ROM 50, the RAM 60, the nonvolatile memory 70, and the recording medium 80) with a cable, a series of data of angular velocities about the three axes detected by the motion sensor 10 was acquired in the RAM 60 by the PC, and the rhythms of swing data included in the acquired data were analyzed and displayed.

Figure 11A:
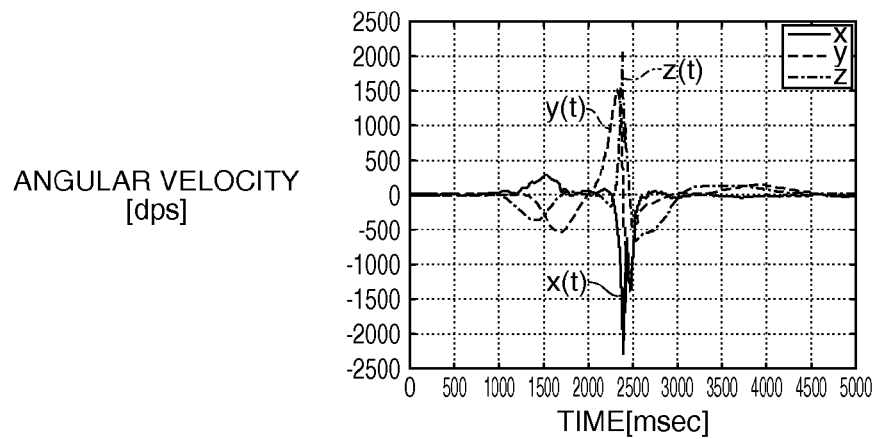
FIG. 11A graphically displays angular velocities about three axes at the time of a full swing, FIG. 11B graphically displays the calculated value of the sum (norm) of the magnitudes of angular velocities about the three axes, and FIG. 11C graphically displays the calculated value of the differential of the sum (norm) of the magnitudes of angular velocities about the three axes.

FIG. 11A graphically displays angular velocities x(t), y(t), and z(t) about the three axes based on data acquired in a data acquiring period (for 5 sec) when the subject picked up the driver to immediately make a full swing. In FIG. 11A, the horizontal axis represents a time (msec) while the vertical axis represents an angular velocity (dps).

Figure 11B:
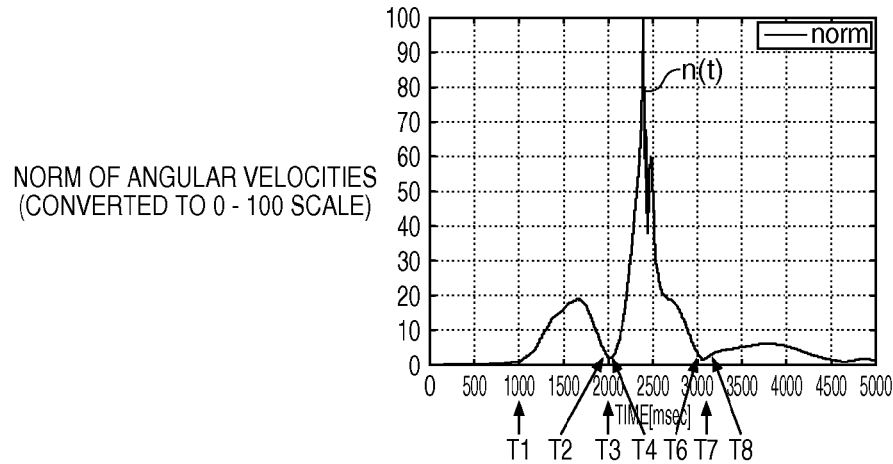

FIG. 11B graphically displays the norm n(t) obtained by calculating the norm $n_0(t)$ of angular velocities about three axes, from the angular velocities x(t), y(t), and z(t) about the three axes of FIG. 11A, according to the expression (1), and thereafter converting (normalizing) the norm $n_0(t)$ to a 0 to 100 scale according to the expression (2). In FIG. 11B, the horizontal axis represents a time (msec) while the vertical axis represents the norm (converted to a 0 to 100 scale) of angular velocities.

Figure 11C:
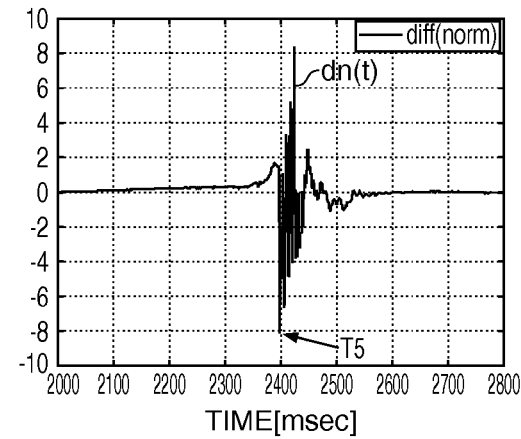
Figure 12:
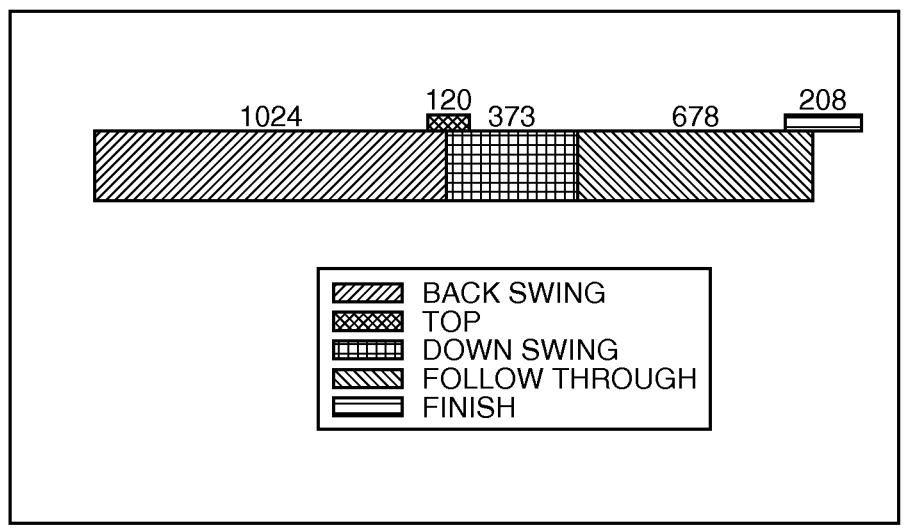
FIG. 12 shows display of the swing motion at the time of the full swing.

FIG. 11C graphically displays the differential dn(t) obtained by calculating from the norm n(t) of angular velocities about three axes of FIG. 11B according to the expression (3). In FIG. 11C, the horizontal axis represents a time (msec) while the vertical axis represents the differential value of the norm of angular velocities about three axes. In FIGS. 11A and 11B, the horizontal axis ranges from 0 to 5 sec. However, the horizontal axis in FIG. 11C ranges from 2 to 2.8 sec so that a change in differential value before and after an impact is seen.

Referring to FIGS. 11B and 11C, swing candidate data was extracted according to the flowchart of the rhythm detection process shown in FIG. 4, and the time point T1 of the swing start, the start time point T2 of the top interval, the time point T3 of the top, the end time point T4 of the top interval, the time point T5 of the impact, the start time point T6 of the finish interval, the time point T7 of the finish, and the end time point T8 of the finish interval were calculated. The results were T1=1000 msec, T2=1967 msec, T3=2024 msec, T4=2087 msec, T5=2397 msec, T6=3002 msec, T7=3075 msec, and T8=3210 msec.

Next, the calculated values of T1 to T8 of the swing data candidates were used to calculate the time Ta of the back swing, the time Tb of the top interval, the time Tc of the down swing, and the entire time T, according to the flowchart of the swing data determining process shown in FIG. 6. The results were Ta=T3−T1=1024 msec, Tb=T4−T2=120 msec, Tc=T5−T3=373 msec, and T=T8−T1=2210 msec.

It was determined whether or not the swing candidate data was true swing data. Then, since only one impact (impact at the time point T5) is present between T1 and T8, and the relations of Ta>Tc and Tb/T≤threshold value (for example, 15%) are satisfied, the swing candidate data satisfies the conditions of swing data.

Therefore, the time Td of the follow through and the time Te of the finish interval were next calculated according to the rhythm display process shown in FIG. 8, resulting in Td=T7−T5=678 msec and Te=T8−T6=208 msec. The rhythm display shown in FIG. 12 was obtained.

Figure 13A:
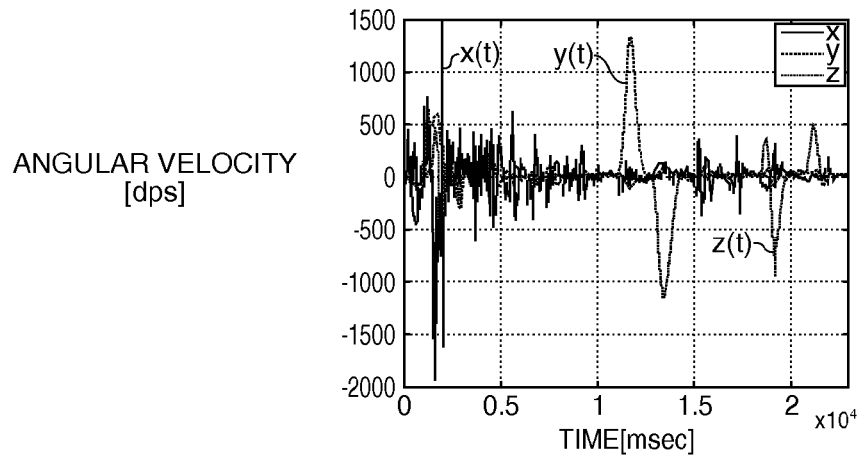
FIG. 13A graphically displays angular velocities about three axes at the time of a swing, FIG. 13B graphically displays the calculated value of the sum (norm) of the magnitudes of angular velocities about the three axes, and FIG. 13C graphically displays the calculated value of the differential of the sum (norm) of the magnitudes of angular velocities about the three axes.

In contrast to this, FIG. 13A graphically displays the angular velocities x(t), y(t), and z(t) about the three axes based on data acquired in a data acquiring period (for about 25 sec) when the subject picked up the driver to make a full swing after moving the driver before the swing. In FIG. 13A, the horizontal axis represents a time (msec) while the vertical axis represents an angular velocity (dps).

Figure 13B:
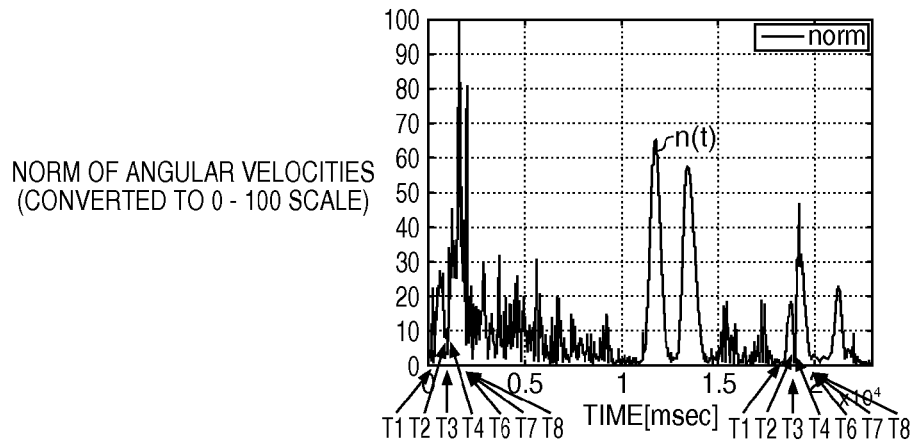

FIG. 13B graphically displays the norm n (t) obtained by calculating the norm $n_0(t)$ of angular velocities about three axes, from the angular velocities x(t), y(t), and z(t) about the three axes of FIG. 13A, according to the expression (1), and thereafter converting (normalizing) the norm $n_0(t)$ to a 0 to 100 scale according to the expression (2). In FIG. 13B, the horizontal axis represents a time (msec) while the vertical axis represents the norm (converted to a 0 to 100 scale) of angular velocities.

Figure 13C:
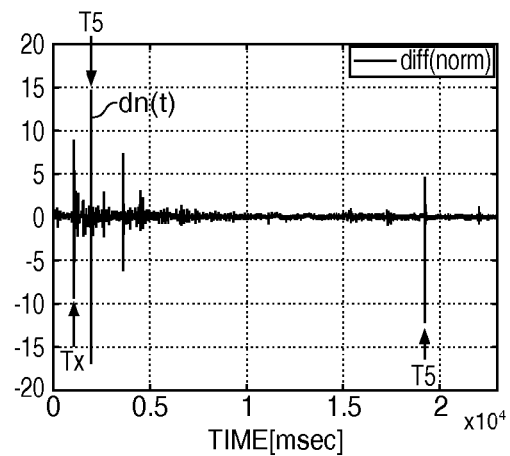
Figure 14:
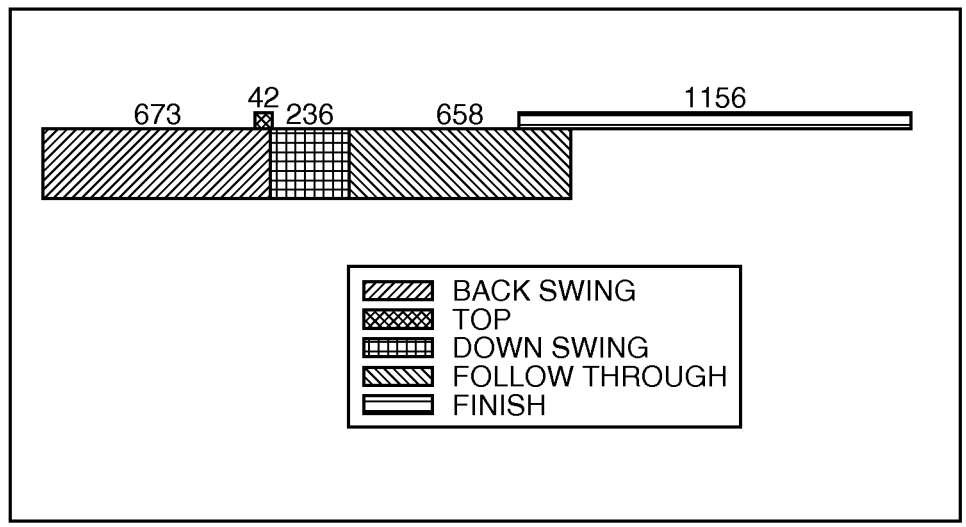
FIG. 14 shows display of the swing motion at the time of the swing.

FIG. 13C graphically displays the differential dn(t) obtained by calculating from the norm n(t) of angular velocities about three axes of FIG. 13B according to the expression (3). In FIG. 13C, the horizontal axis represents a time (msec) while the vertical axis represents the differential value of the norm of angular velocities about three axes.

Referring to FIGS. 13B and 13C, swing candidate data was extracted according to the flowchart of the rhythm detection process shown in FIG. 4 to calculate the time point T1 of the swing start, the start time point T2 of the top interval, the time point T3 of the top, the end time point T4 of the top interval, the time point T5 of the impact, the start time point T6 of the finish interval, the time point T7 of the finish, and the end time point T8 of the finish interval. As a result, swing candidate data of T1=307 msec, T2=984 msec, T3=998 msec, T4=1019 msec, T5=1982 msec, T6=2092 msec, T7=2100 msec, and T8=2109 msec were extracted.

Next, the calculated values of T1 to T8 of the first swing data candidates were used to calculate, according to the flowchart of the swing data determining process shown in FIG. 6, the time Ta of the back swing, the time Tb of the top interval, the time Tc of the down swing, and the entire time T. The results were Ta=T3−T1=691 msec, Tb=T4−T2=35 msec, Tc=T5−T3=984 msec, and T=1802 msec.

It was determined whether or not the first swing candidate data was true swing data. Since two impacts (an impact at a time point Tx and an impact at the time point T5) are present between T1 and T8, and the relation of Ta<Tc is established, the first swing candidate data does not satisfy the conditions of swing data.

Accordingly, it was determined that the first swing candidate data was not true swing data. A second rhythm detection process was performed on remaining data obtained by removing the data at and before the time point T8 from all data to extract swing candidate data, and T1 to T8 were calculated. As a result, swing candidate data of T1=18324 msec, T2=18976 msec, T3=18997 msec, T4=19018 msec, T5=19233 msec, T6=19746 msec, T7=19891 msec, T8=20902 msec were extracted.

Next, the calculated values of T1 to T8 of the second swing data candidates were used to calculate Ta, Tb, Tc, and T. The results were Ta=673 msec, Tb=42 msec, Tc=236 msec, and T=2578 msec.

Then, it was determined whether or not the second swing candidate data was true swing data. Since only one impact (impact at the time point T5) is present between T1 and T8, and the relations of Ta>Tc and Tb/T threshold value (for example, 15%) are satisfied, the second swing candidate data satisfies the conditions of swing data.

Therefore, the time Td of the follow through and the time Te of the finish interval were next calculated according to the rhythm display process shown in FIG. 8, resulting in Td=658 msec and Te=1156 msec. The rhythm display shown in FIG.

14 was obtained. In this manner, even when the user freely moved before the swing motion, swing data was correctly selected, and detailed rhythm data of the swing motion was obtained.

In the examples of FIGS. 11A to 11C and FIGS. 13A to 13C as described above, the step (S130) of calculating the value of the differential dn(t) of the norm (norm after normalization) n(t) at each of the time points t can be omitted. Particularly, for a swing having a large change in the norm of angular velocities, like a driver swing, the differential step (S130) can be omitted. In the case of omitting the differential step, the maximum value of the norm (FIGS. 11B and 13B) of angular velocities obtained at S120 may be detected as the timing of the maximum impact.

According to the embodiment as described above, since swing candidate data is extracted from detection data acquired from the motion sensor 10 to determine whether or not the swing candidate data is swing data, a user does not need to indicate the timing of the start or end of the swing motion. Accordingly, the user can freely move before and after a swing, and therefore, the swing can be analyzed in a natural movement.

Moreover, according to the embodiment, it is determined, by evaluating the validity of a detected rhythm, whether or not swing candidate data is swing data. Therefore, compared to the case of performing waveform pattern matching, swing data can be extracted with a smaller calculation load.

Moreover, according to the embodiment, an angular velocity sensor is used as the motion sensor 10, whereby compared to the case of using an acceleration sensor, a swing motion can be detected more precisely, and a swing with a small movement can also be detected. Accordingly, more detailed analysis can be performed, such as for example, how slowly a golf club lags behind at top and finish. Moreover, it is possible on the basis of the impact to detect at least one of the motions of the start of a swing, back swing, top, down swing, follow through, and the end of the swing.

Moreover, according to the embodiment, since a swing motion is detected based on the norm of angular velocities, the motion sensor 10 can be mounted in any direction at a place moving in association with the swing motion. Therefore, the motion sensor 10 is easy to handle.

Moreover, according to the embodiment, the timing of the impact, which is most easily grasped in the series of swing motions because the value of the norm of angular velocities changes abruptly, is first detected, and each of the phases of the swing motion is specified based on the timing of the impact, whereby the swing motion can be detected more reliably.

Moreover, according to the embodiment, since the time of each of the phases of the swing motion is displayed, a user can easily grasp detailed rhythms of the swing motion.

4. Modified Examples

The invention is not limited to the embodiment, and various kinds of modifications can be implemented within the range of the gist of the invention. For example, the following modified examples are conceivable.

Modified Example 1

Figure 15:
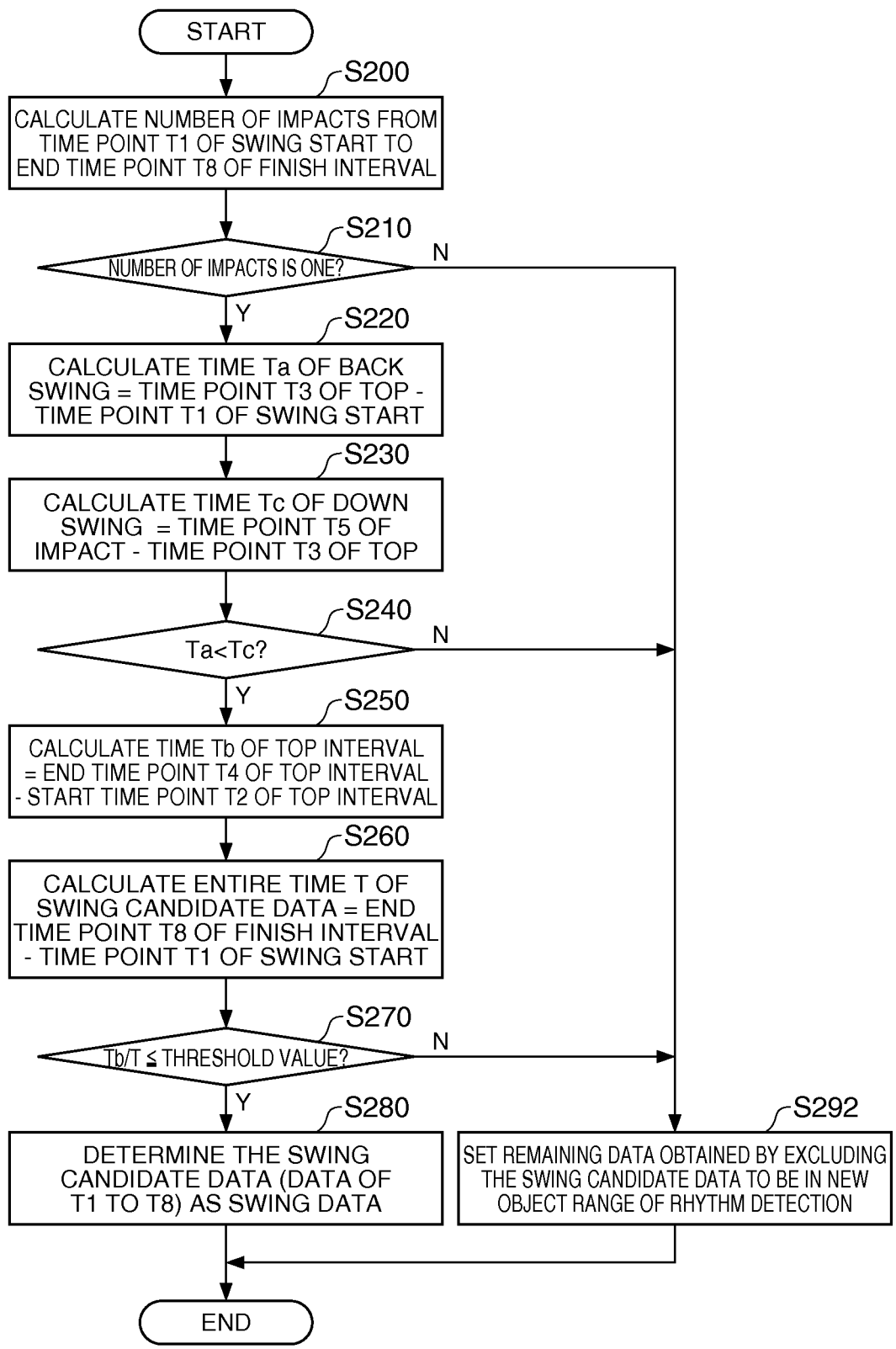
FIG. 15 is a flowchart showing a swing data determining process of Modified Example 1.

FIG. 15 is a flowchart showing a swing data determining process in Modified Example 1. In FIG. 15, the same processes as those of FIG. 6 are denoted by the same reference and numeral signs. As shown in FIG. 15, in the swing data determining process in Modified Example 1, if it was determined that swing candidate data was not swing data (N at S210, N at S240, or N at S270), remaining data obtained by excluding the swing candidate data (data of the time points T1 to T8) from the object range of rhythm detection is set to be in a new object range of rhythm detection (S292). The other processes in FIG. 15 are the same as those of FIG. 6.

Figure 16:
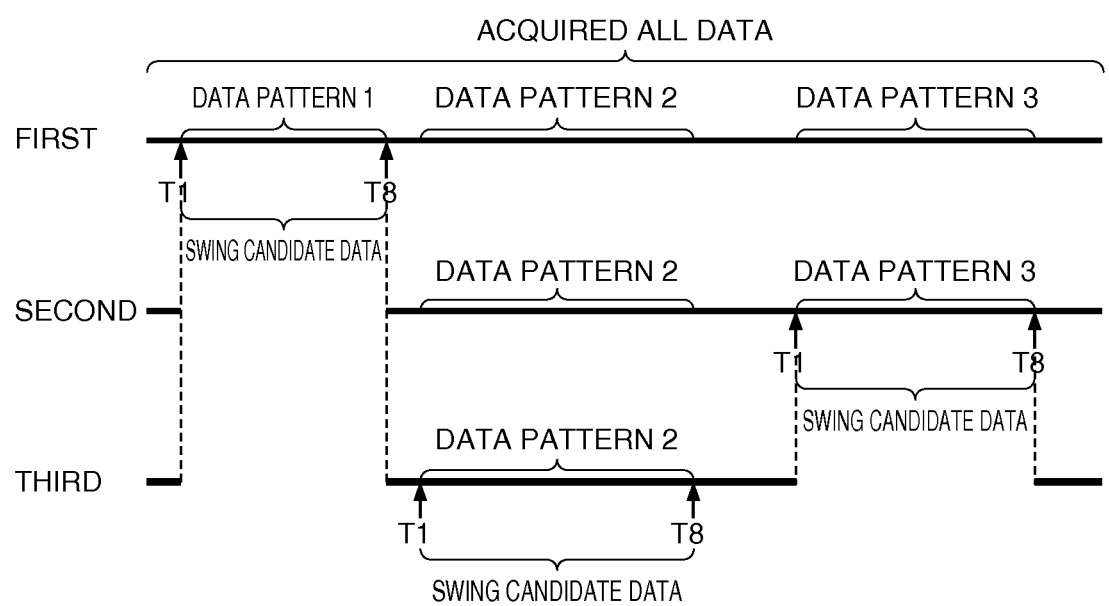
FIG. 16 is an explanatory view of the swing data determining process of Modified Example 1.

For example, it is assumed that three data patterns (the data pattern 1, the data pattern 2, and the data pattern 3 in time series order) serving as swing candidate data are included in all data acquired from the motion sensor 10, and that the second data pattern 2 is swing data. In this case, as shown in FIG. 16, all the data acquired from the motion sensor 10 is used as rhythm detection object data, and a first rhythm detection process is performed on the data. For example, the data pattern 1 is detected as swing candidate data. Then, since the data pattern 1 is not true swing data, second rhythm detection is performed on remaining data obtained by removing the data pattern 1 from the first rhythm detection object data. If the data pattern 3, for example, is detected in the second rhythm detection process, since the data pattern 3 is also not true swing data, third rhythm detection is performed on remaining data obtained by removing the data pattern 3 from the second rhythm detection object data. The data pattern 2 is detected in the third rhythm detection process, and the data pattern 2 is determined as true swing data.

According to Modified Example 1 as described above, even when a user moves in such a way that causes a big impact not only before the swing motion but also after the swing motion, the swing motion can be reliably detected.

Modified Example 2

Figure 17:
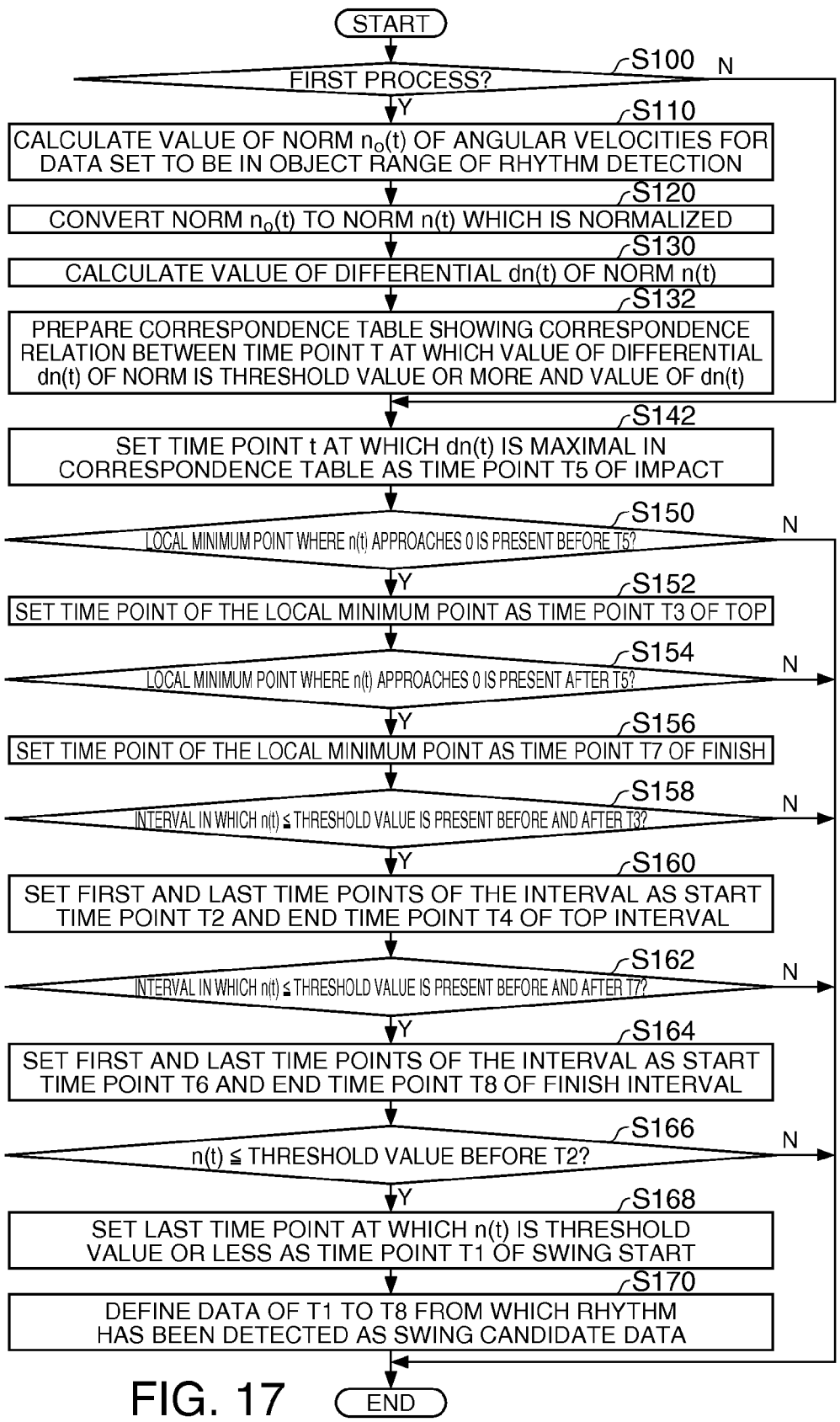
FIG. 17 is a flowchart showing a detection process of a swing motion of Modified Example 2.
Figure 18:
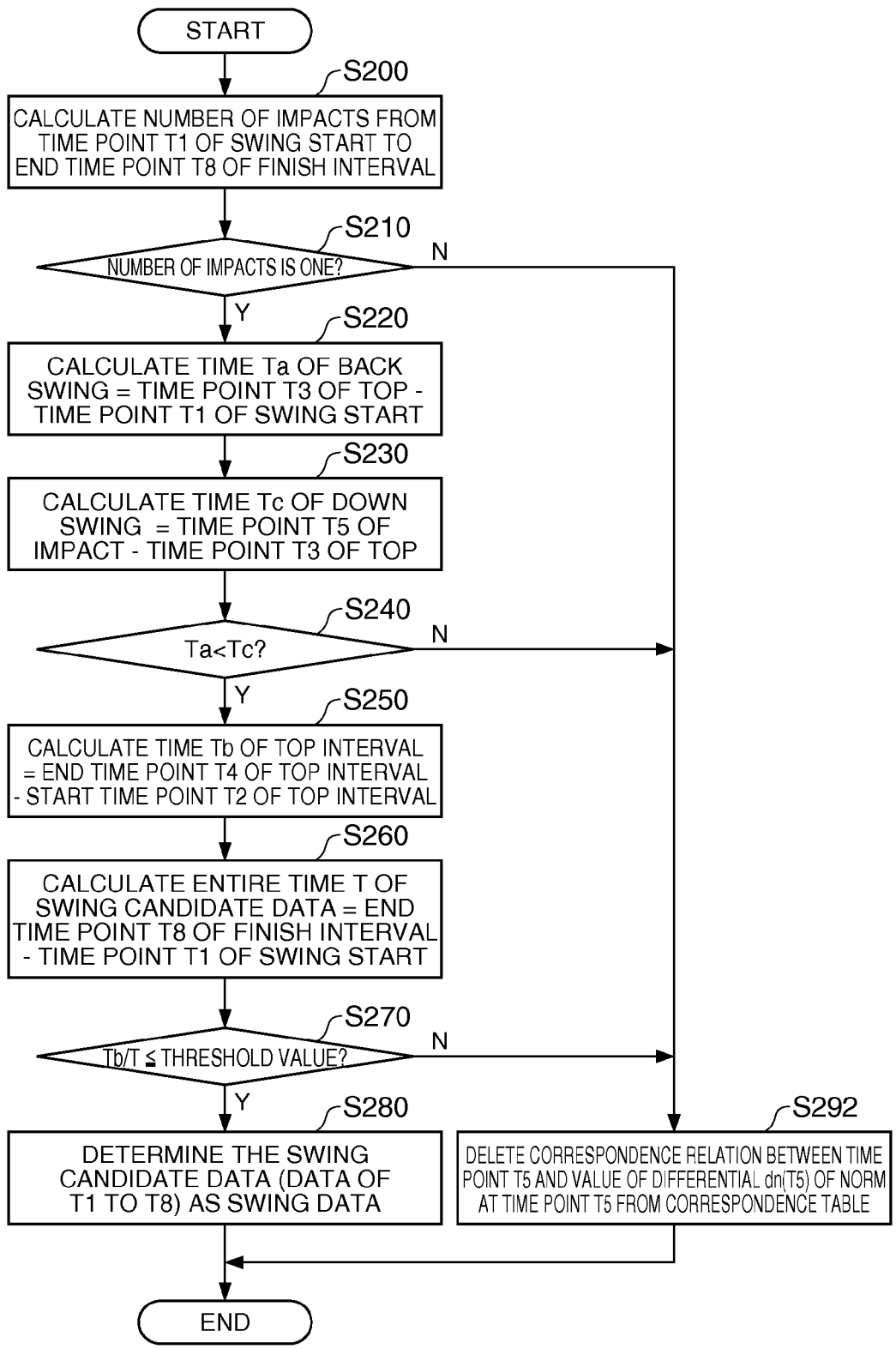
FIG. 18 is a flowchart showing a swing data determining process of Modified Example 2.

FIG. 17 is a flowchart showing a rhythm detection process in Modified Example 2. Moreover, FIG. 18 is a flowchart of a swing data determining process in Modified Example 2. As shown in FIG. 17, in the rhythm detection process in Modified Example 2, a table showing a correspondence relation between the value of the differential dn(t) of the norm and the time point t at which the value of the dn(t) is a preset threshold value or more is prepared in a first rhythm detection process (Y at S100) (S132). Then, the time point t at which the dn(t) is maximal in the correspondence table prepared at Step S132 is set as the time point T5 of the impact (maximum impact) (S142). The other processes in FIG. 17 are the same as those of FIG. 4.

Moreover, as shown in FIG. 18, in the swing data determining process in Modified Example 2, if it was determined that swing candidate data was not true swing data (N at S210, N at S240, or N at S270), the correspondence relation between the time point T5 and the value of a differential dn(T5) of the norm at the time point T5 is deleted from the correspondence table (S292). This new correspondence table is used to perform a second and subsequent rhythm detection processes.

According to Modified Example 2 as described above, in the second and subsequent rhythm detection processes, the trouble of restarting a detection process of an impact from the beginning can be avoided. Therefore, the calculation amount and the calculation time can be reduced.

Other Modified Examples

For example, when a user performs a swing motion a plurality of times in succession in a data acquiring period, information before and after a plurality of impacts may be analyzed based on data including the plurality of impacts according to the flowcharts of FIGS. 4 and 6, and a plurality pieces of swing data respectively corresponding to the plurality of swing motions may be sorted out from each other. For example, rhythms corresponding to the plurality pieces of sorted swing data may be displayed by arranging them in time series order. By doing this, the swing motions in making a swing a plurality of times in succession can be extracted, so that a user can clearly evaluate the stability of the swing motions.

Moreover, information of the rhythms of swing motions detected in the past may be stored for every user, and the averaged information thereof may be used to set the various kinds of threshold values used in the swing data determining process. By doing this, the individual characteristic of a user can be reflected to enhance the detection accuracy of swing motion.

The invention includes a configuration (for example, a configuration having the same function, method, and result, or a configuration having the same advantage and effect) which is substantially the same as those described in the embodiment. Moreover, the invention includes a configuration in which a non-essential portion of the configurations described in the embodiment is replaced. Moreover, the invention includes a configuration providing the same operational effects as those described in the embodiment, or a configuration capable of achieving the same advantages. Moreover, the invention includes a configuration in which a publicly known technique is added to the configurations described in the embodiment.

The entire disclosure of Japanese Patent Application No. 2011-129134, filed Jun. 9, 2011 is expressly incorporated by reference herein.

What is claimed is:

1. A swing analyzing device comprising:
a motion sensor that detects a physical quantity generated by a swing, wherein the motion sensor is an angular velocity sensor that detects angular velocities generated about a plurality of axes by the swing;
a data acquiring unit that acquires detection data of the motion sensor;
a motion detecting unit that detects a motion of the swing using the acquired detection data and extracts, as swing candidate data, data from which the motion of the swing is detected;
a swing data determining unit that selects true swing data from the swing candidate data based on determination conditions associated with the swing
a display processing unit that calculates, based on the motion of the swing detected by the motion detecting unit, a time of the motion of the swing and displays a calculation result on a screen, wherein:
the motion detecting unit includes an impact detecting unit and an angular velocity calculating unit,
the impact detecting unit sets a timing of an impact of the swing using the acquired detection data, and sets the motion of the swing of the swing candidate data based on the timing of the impact, and
the angular velocity calculating unit calculates the sum of the magnitudes of the angular velocities generated about the plurality of respective axes using the acquired detection data.

2. The swing analyzing device according to claim 1, wherein
the motion of the swing includes at least one motion of back swing, top, and down swing.

3. The swing analyzing device according to claim 1, wherein
the swing data determining unit uses, as one of the determination conditions, a condition that the number of timings of the impacts is one in one piece of the swing candidate data.

4. The swing analyzing device according to claim 2, wherein
the swing data determining unit uses, as one of the determination conditions, a condition that a time of the down swing is shorter than a time of the back swing in one piece of the swing candidate data.

5. The swing analyzing device according to claim 2, wherein
the swing data determining unit uses, as one of the determination conditions, a condition that a value obtained by dividing a time of the top by a time from the start of the swing to the end of the swing of the swing candidate data is smaller than a first threshold value in one piece of the swing candidate data.

6. The swing analyzing device according to claim 1, wherein
the motion detecting unit uses the sum of the magnitudes of the angular velocities to detect a timing of an impact in the swing.

7. The swing analyzing device according to claim 1, wherein
the motion detecting unit further includes a differential calculating unit which differentiates the sum of the magnitudes of the angular velocities with respect to a point in time.

8. The swing analyzing device according to claim 7, wherein
the motion detecting unit detects a portion where a positive peak and a negative peak successively appear in the differential values, and sets, between the positive peak and the negative peak, the timing of the prior peak as the timing of the impact.

9. The swing analyzing device according to claim 6, wherein
the motion detecting unit sets a timing at which the sum of the magnitudes of the angular velocities is a local minimum before the impact as a timing of top of the swing.

10. The swing analyzing device according to claim 9, wherein
the motion detecting unit sets a timing at which the sum of the magnitudes of the angular velocities is a second threshold value or less before the top as a timing of start of the swing.

11. The swing analyzing device according to claim 6, wherein
the motion detecting unit sets a timing at which the sum of the magnitudes of the angular velocities is a local minimum after the impact as a timing of finish of the swing.

12. The swing analyzing device according to claim 6, wherein
the motion detecting unit sets a first timing at which the sum of the magnitudes of the angular velocities is a third threshold value or less after the impact as a timing of finish of the swing.

13. The swing analyzing device according to claim 10, wherein
the motion detecting unit sets
an interval from the timing of the start of the swing to the timing of the top as a back-swing interval, and
an interval from the timing of the top to the timing of the impact as a down-swing interval.

14. The swing analyzing device according to claim 1, wherein the angular velocity sensor is mountable on at least one of a user's hand, a glove, and swing equipment.

15. The swing analyzing device according to claim 1, wherein the swing is a golf swing.

16. A swing analyzing computer program stored in a non-transitory computer readable medium and executed by a processor, the swing analyzing computer program comprising instructions for:

acquiring, from a motion sensor, detection data of a physical quantity generated by a swing, wherein the motion sensor is an angular velocity sensor that detects angular velocities generated about a plurality of axes by the swing;

detecting a motion of the swing using the acquired detection data and extracting, as swing candidate data, data from which the motion of the swing is detected;

selecting true swing data from the swing candidate data based on determination conditions associated with the swing;

calculating the sum of the magnitudes of the angular velocities generated about the plurality of respective axes using the acquired detection data;

calculating, based on the motion of the swing detected, a time of the motion of the swing;

setting a timing of an impact in the swing based on the sum of the magnitudes of the angular velocities; and displaying the time of the motion of the swing and the motion of the swing.

17. A swing analyzing method comprising:

acquiring, from a motion sensor, detection data of a physical quantity generated by a swing, wherein the motion sensor is an angular velocity sensor that detects angular velocities generated about a plurality of axes by the swing;

detecting, by a swing analyzing device, a motion of the swing using the detection data acquired;

extracting, by the swing analyzing device, data from which the motion of the swing is detected as swing candidate data;

selecting, by the swing analyzing device, true swing data from the swing candidate data based on determination conditions associated with the swing;

calculating, by the swing analyzing device, the sum of the magnitudes of the angular velocities generated about the plurality of respective axes using the acquired detection data;

calculating, based on the motion of the swing detected, a time of the motion of the swing;

setting, by the swing analyzing device, a timing of an impact in the swing based on the sum of the magnitudes of the angular velocities; and displaying the time of the motion of the swing and the motion of the swing.

* * * * *